(12) United States Patent
Tuck et al.

(10) Patent No.: US 8,614,623 B2
(45) Date of Patent: Dec. 24, 2013

(54) PERSONAL DIGITAL ASSET MANAGER

(75) Inventors: Edward F. Tuck, West Covina, CA (US); David L. Payne, Morgan Hill, CA (US); Thomas N. Giaccherini, Carmel Valley, CA (US); Michael Keddington, Newport Beach, CA (US); Douglas G. Lockie, Los Gatos, CA (US); Douglas Sallen, Monterey, CA (US); James R. Stuart, Louisville, CO (US)

(73) Assignee: Pascal's Pocket Corporation, West Covina, CA (US)

( * ) Notice: Subject to any disclaimer, the term of this patent is extended or adjusted under 35 U.S.C. 154(b) by 1105 days.

(21) Appl. No.: 12/315,367

(22) Filed: Dec. 1, 2008

(65) Prior Publication Data

US 2010/0134247 A1    Jun. 3, 2010

(51) Int. Cl.
| | |
|---|---|
| *G05B 19/00* | (2006.01) |
| *G06F 7/00* | (2006.01) |
| *G08B 29/00* | (2006.01) |
| *H04B 1/00* | (2006.01) |
| *H04Q 1/00* | (2006.01) |

(52) U.S. Cl.
USPC ......... 340/5.6; 340/5.61; 340/5.53; 340/10.1; 340/10.5

(58) Field of Classification Search
CPC ............ G06F 21/00; G06F 21/02; G06K 9/10
USPC ............. 340/5.6, 5.61, 5.64, 5.53, 10.1–10.5; 382/123, 116; 235/492, 380; 713/186, 713/182, 168
See application file for complete search history.

(56) References Cited

U.S. PATENT DOCUMENTS

| | | | | | |
|---|---|---|---|---|---|
| 5,623,552 | A | * | 4/1997 | Lane | 382/124 |
| 5,825,876 | A | * | 10/1998 | Peterson, Jr. | 705/52 |
| 6,484,260 | B1 | * | 11/2002 | Scott et al. | 713/186 |
| 6,695,207 | B1 | * | 2/2004 | Norris, Jr. | 235/382 |
| 6,879,710 | B1 | * | 4/2005 | Hinoue et al. | 382/124 |
| 6,917,958 | B1 | * | 7/2005 | Howe et al. | 709/203 |
| 6,992,562 | B2 | * | 1/2006 | Fuks et al. | 340/5.52 |
| 7,012,503 | B2 | * | 3/2006 | Nielsen | 340/5.6 |
| 7,089,236 | B1 | * | 8/2006 | Stibel | 1/1 |
| 7,203,696 | B2 | * | 4/2007 | Atm | 1/1 |
| 7,762,470 | B2 | * | 7/2010 | Finn et al. | 235/492 |
| 7,809,954 | B2 | * | 10/2010 | Miller et al. | 713/186 |
| 7,836,269 | B2 | * | 11/2010 | Obereiner et al. | 711/163 |
| 7,965,873 | B2 | * | 6/2011 | Goto | 382/115 |
| 7,969,280 | B2 | * | 6/2011 | Slevin | 340/5.31 |
| 8,171,528 | B1 | * | 5/2012 | Brown | 726/3 |
| 2003/0174049 | A1 | * | 9/2003 | Beigel et al. | 340/10.42 |
| 2004/0177128 | A1 | * | 9/2004 | Northway | 709/217 |
| 2005/0160223 | A1 | * | 7/2005 | Chen et al. | 711/115 |
| 2009/0070769 | A1 | * | 3/2009 | Kisel | 718/104 |

* cited by examiner

*Primary Examiner* — Nam V Nguyen
(74) *Attorney, Agent, or Firm* — Thomas N. Giaccherini

(57) ABSTRACT

Methods and apparatus for a Personal Digital Asset Manager are disclosed. One embodiment of the present invention is a miniature electronic device, which functions as a fully-powered personal computer, which stores digital files and content, and which communicates wirelessly with external input and output devices and a network such as the Internet. In one embodiment, the present invention may be carried in a pocket or purse, clipped on a belt or incorporated into a pair of glasses.

109 Claims, 58 Drawing Sheets

Personal Digital Asset Manager ("d-Pal™")

Personal Digital Asset Manager ("d-Pal™")

"d-PAL™" Input/Output Devices

"d-Pal™" Wireless Services Interfaces

Schematic Block Diagram

"d-Pal™" Features

Fig. 27  Use with Social Networking Device

Use as a Pedometer or Health Monitor

Exemplary d-Pal "Applications and Organizer"

- Manage Multiple Personas per Unique "E-Mail Addresses" and "Identities" (Profiles)
- Per Persona Records: Heuristic Search, Relevance Search Enable, Record of File Usage, Web Access / Bookmarks, Passwords, Preferences, Privileges.
- Information / Content Access per Persona: Resident Data, Connection Access, Web Links, Accounts, Etc.
- Control Relationships of Others and with Others per Your Personas: e.g. Parent/Child, Teacher/Student, Project Leader....
- Control Information Flows To/From Other Devices (i.e. Back Ups, Tag Files w/ Track & Trace, Encrypt File To / From, Hierarchical Access, Workflow Register, Restrictions / Access Encourage, Triggers / Alerts....)
- Automatic / Painless Back Ups Per Personas & Partitions

Fig. 48 d-Pal Managing Personas and Behaviors

- Each Persona We Project has Responsibilities:
  - For Business, They Have Compliance Rules / Policy
  - For Interpersonal Communications, it is Appropriateness
  - For Families, They are Context for Shielding / Protecting.

- Record of Information Flows and Computer Uses
  - Set Access Rules & Privileges
  - Dynamic Security via UltraSecure
  - Password Capture, Account Info and Access Event Log
  - Dynamic Partitioning™ to Manage Info Flows
  - Confidential Information Track & Trace

- Business and Personal "On the Clock" Access Record

Fig. 49

Mirrored Back-Up with Most Recent Updates to Another Device, Docking Base or Web Service

Fig. 52

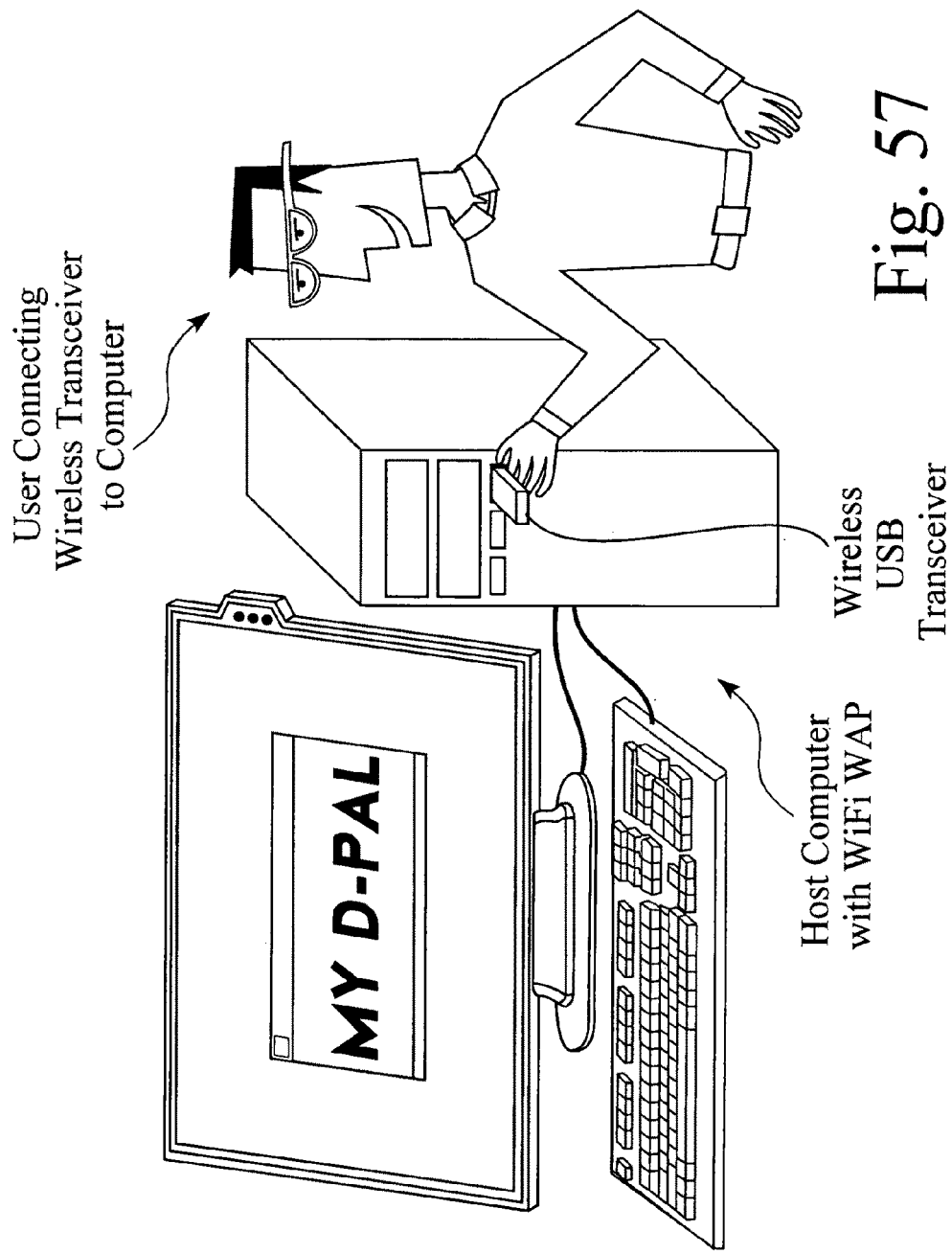

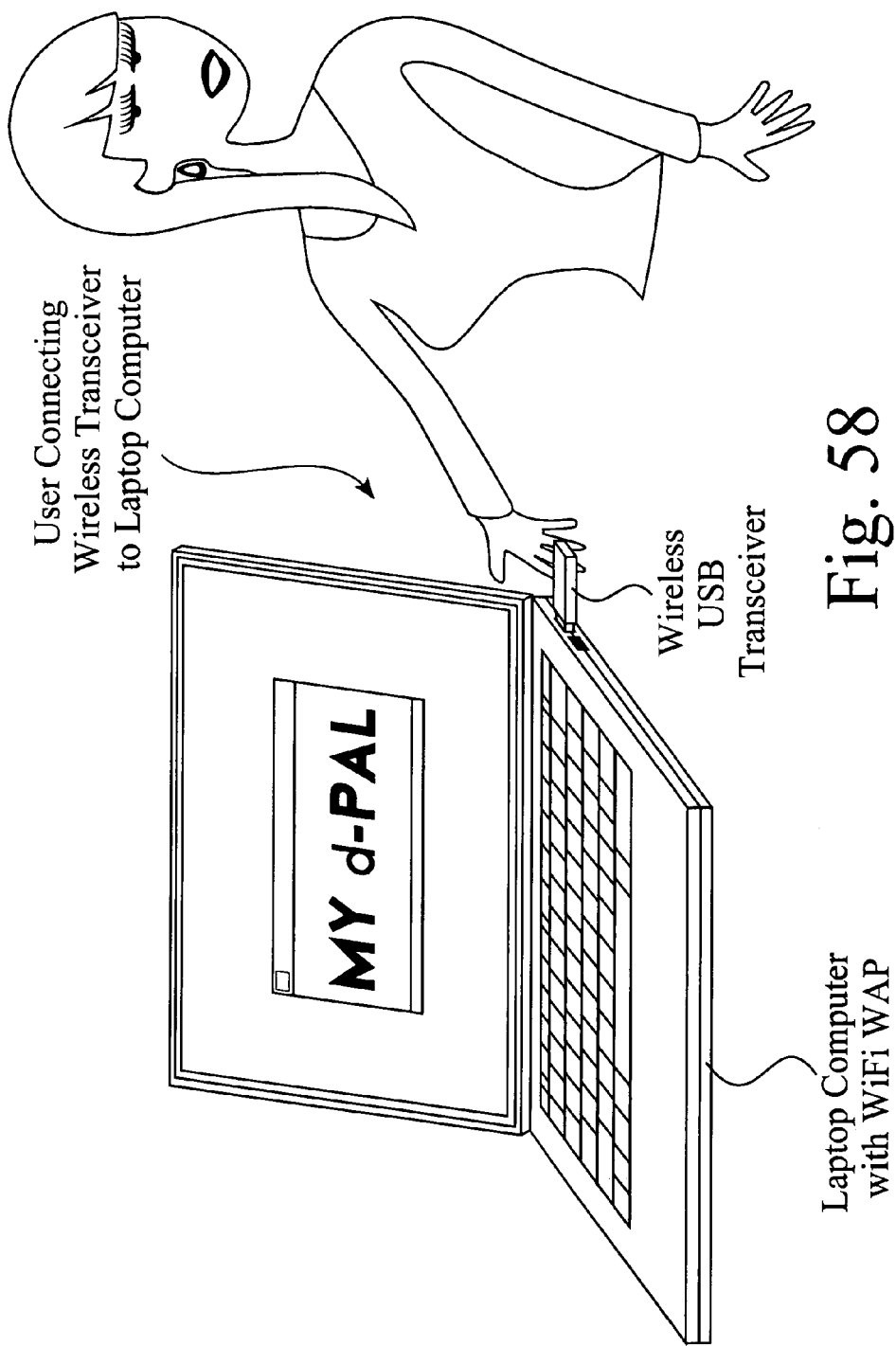

PERSONAL DIGITAL ASSET MANAGER

PROVISIONAL PATENT APPLICATION & CLAIMS FOR PRIORITY

The Present Patent Application is related to a Pending U.S. Provisional Patent Application, U.S. Ser. No. 60/005,640, filed on 5 Dec. 2007. The Applicants hereby claim the benefit of priority under Sections 119 and/or 120 of Title 35 of the United States Code of Laws for any subject matter which is commonly disclosed in the Present Non-Provisional Patent Application and in the corresponding Pending Provisional Application.

FIELD OF THE INVENTION

The present invention pertains to methods and apparatus for a Personal Digital Asset Manager. One embodiment of the present invention is a miniature electronic device which functions as a fully-powered personal computer that includes an operating system and various software applications. In one embodiment, the present invention may be held by a keyring, carried in a pocket or purse, clipped to a belt, or incorporated into a pair of eyeglasses. The invention communicates wirelessly to peripheral input and output devices, such as a display or keyboard. In one embodiment, the invention communicates wirelessly with a network, such as the Internet or telephone system. The invention may be used to store and manage digital files, history, preferences and content.

BACKGROUND OF THE INVENTION

According to the Computer Industry Almanac, the total cumulative sales of personal computers worldwide will exceed two billion in the year 2008. Conventional computers require a variety of input and output devices to use and enjoy the content stored in their memories, or the content which they obtain from networks, such as the Internet. These input and output devices may include a display, a keyboard, a mouse and speakers.

The conventional personal computers that are currently in use include larger and heavier desk top computers, and generally smaller and more mobile laptop computers and personal digital assistants. A wide variety of other electronic devices which communicate or store digital files, such as cellular phones, MP-3 players or game players, are also available to perform a limited set of specialized tasks. All of these conventional devices generally include or are incorporated with input and output devices.

Although their owners may consider these conventional devices to be important and valuable, the most valuable part of each of these devices is the set of data, files and content which is stored on each device.

No current device that is generally commercially available which stores digital files and content securely, offers full computing power, operates using an on-board power supply, communicates wirelessly to other devices and networks, and is ultra-miniaturized, so that the device may be carried on a keyring, in a pocket, purse or bag; clipped to a belt; or worn as glasses or as an item of clothing.

The development of a device that would offer these capabilities would constitute a major technological advance, and would satisfy long felt needs and aspirations in the computing, entertainment and telecommunications businesses.

A BRIEF DESCRIPTION OF THE DRAWINGS

FIG. 1 reveals one embodiment of the invention, the "d-Pal™", which may reside on a common keyring.

FIG. 2 provides a front view of one embodiment of the d-Pal™.

FIG. 3 furnishes a side view of one embodiment of the invention.

FIG. 4 offers a bottom or end view.

FIG. 5 shows one embodiment of the d-Pal connected to peripheral devices using wireless links.

FIG. 6 exhibits a d-Pal communicating over Bluetooth, Wi-Fi, WiMAX, cellular and other wireless connections.

Figure 12:
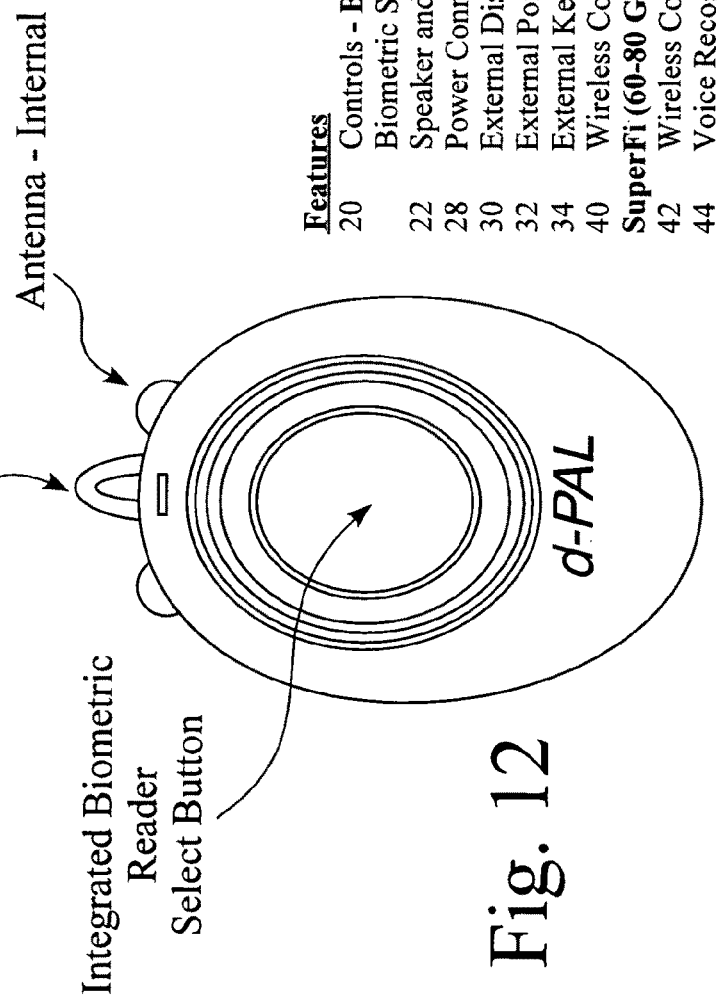

FIG. 12 offers a pictorial view of an alternative embodiment of the invention.

Figure 13:
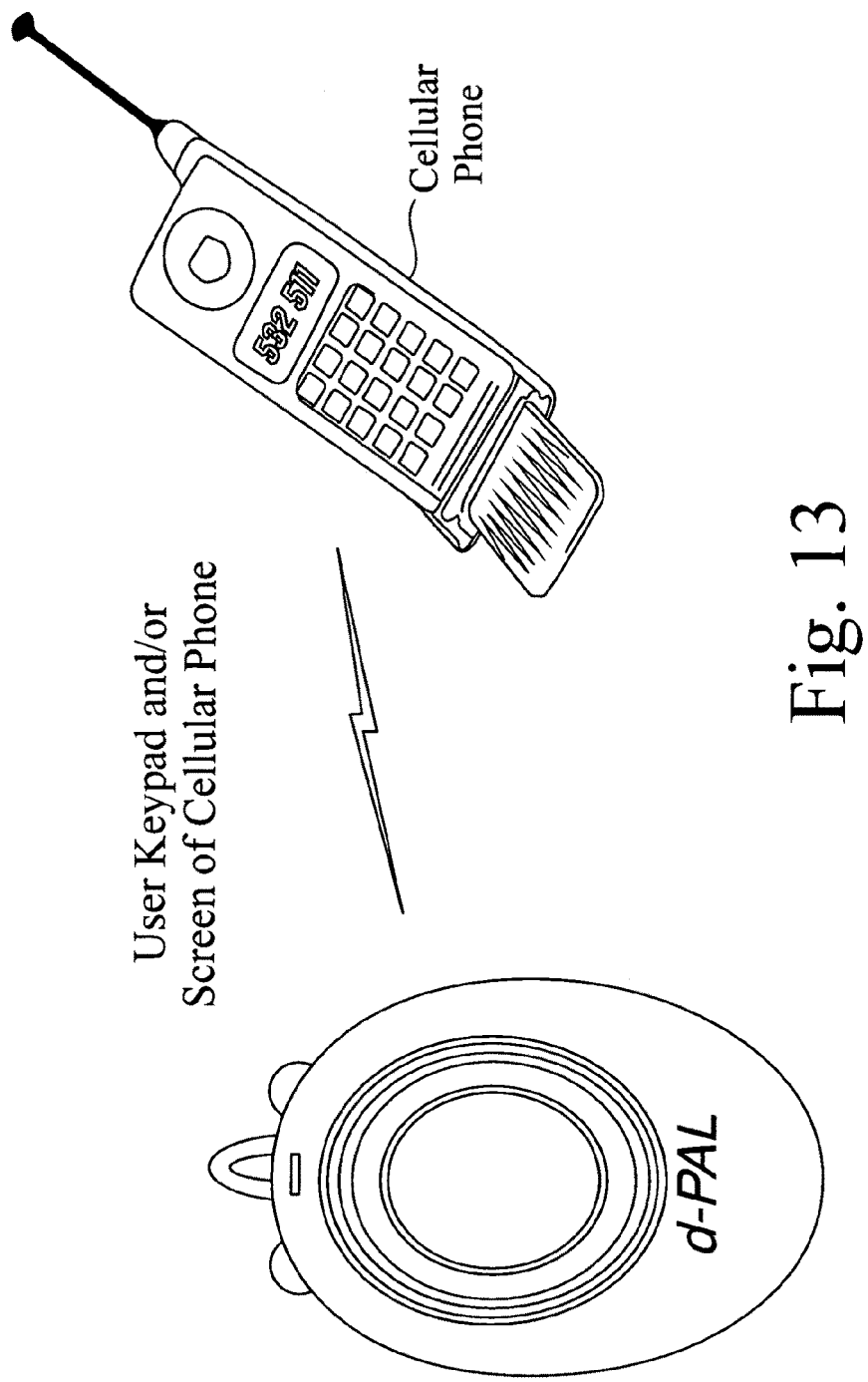

FIG. 13 portrays the use of the invention with the keypad and screen of a conventional cellular telephone or some other suitable device.

Figure 14:
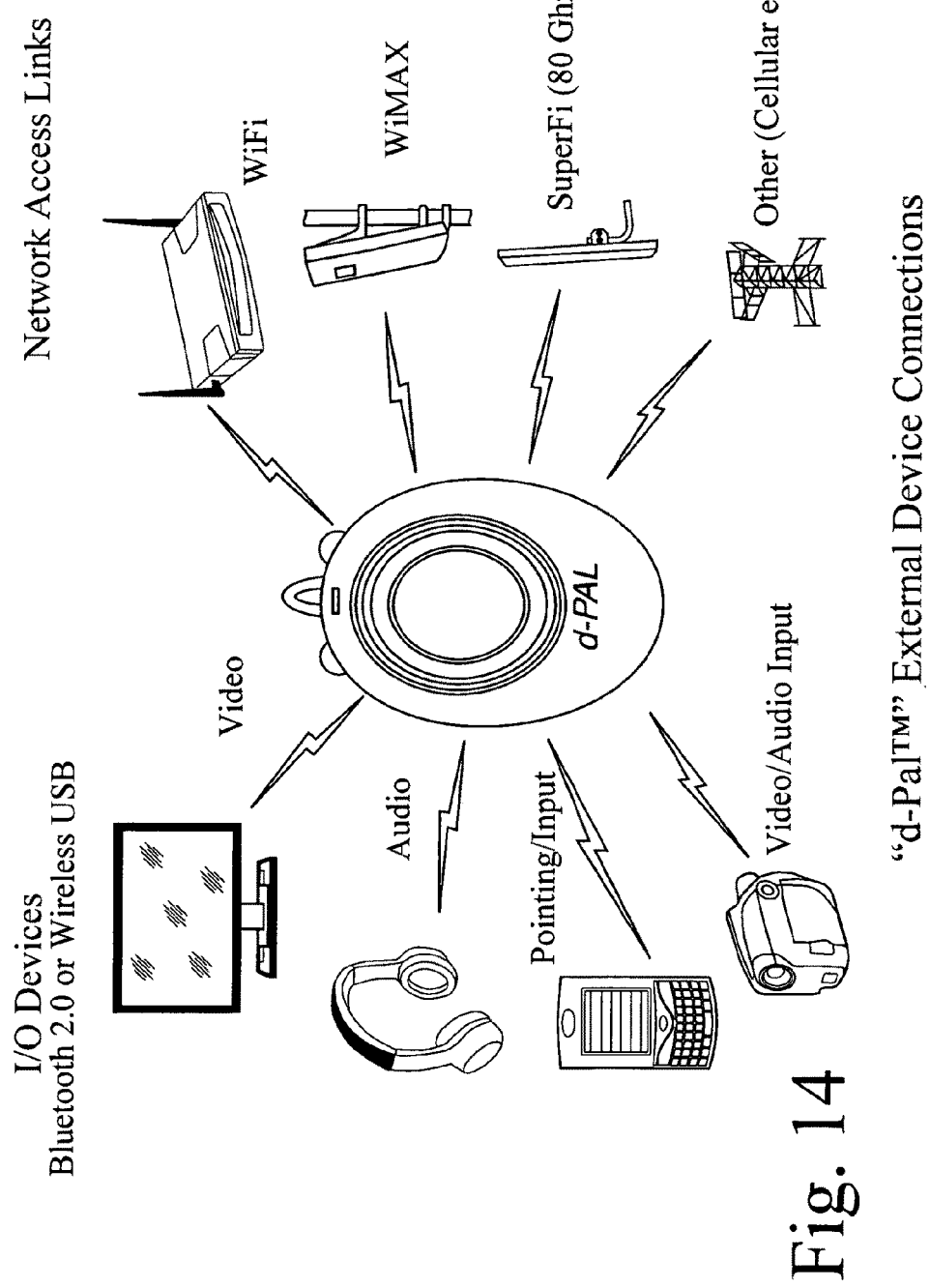
Figure 15:
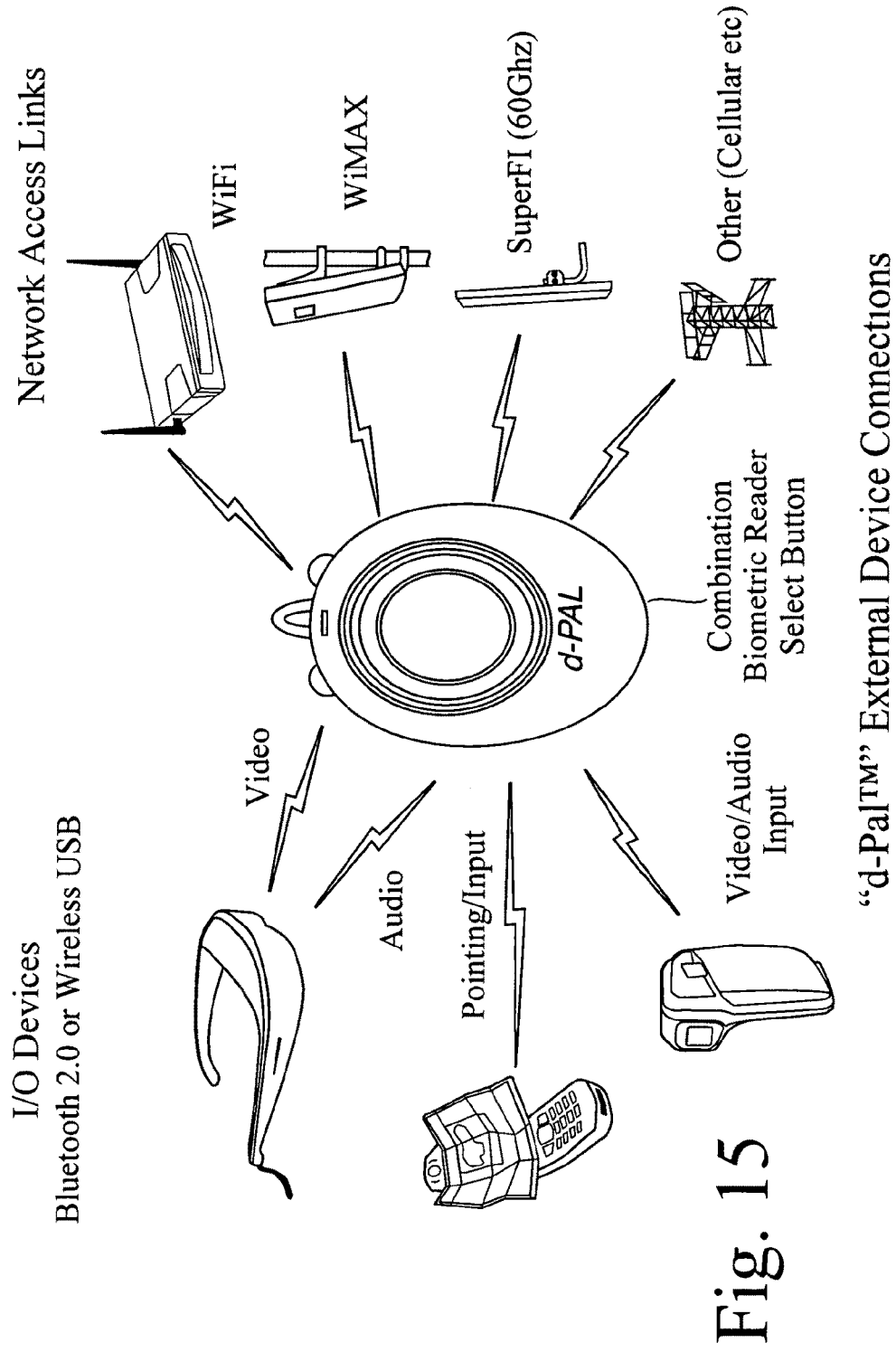

FIGS. 14 and 15 reveal how the invention may connect to other devices and networks.

Figure 16:
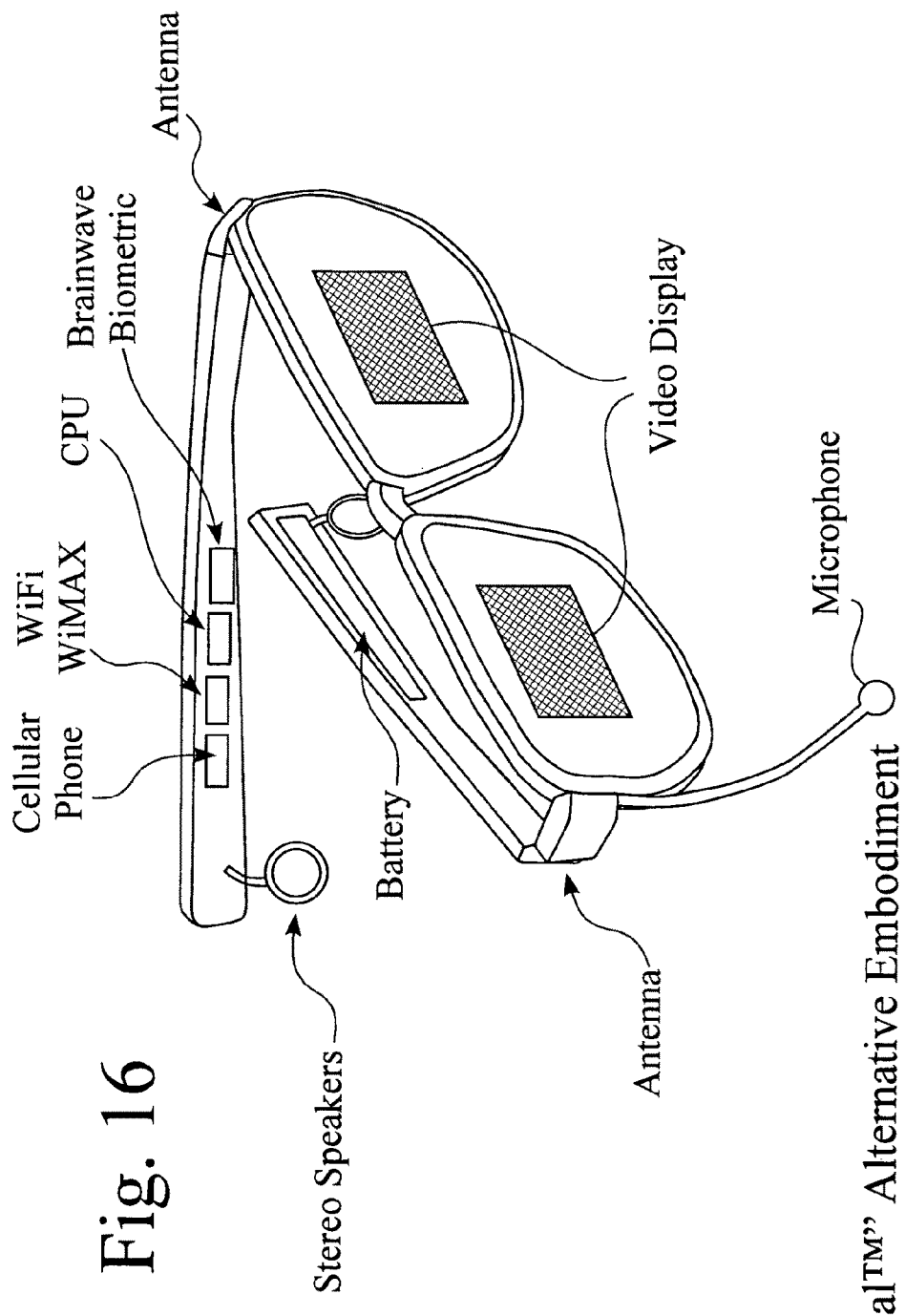

FIG. 16 illustrates an alternative embodiment of the invention, which is incorporated into a pair of eyeglasses.

Figure 17:
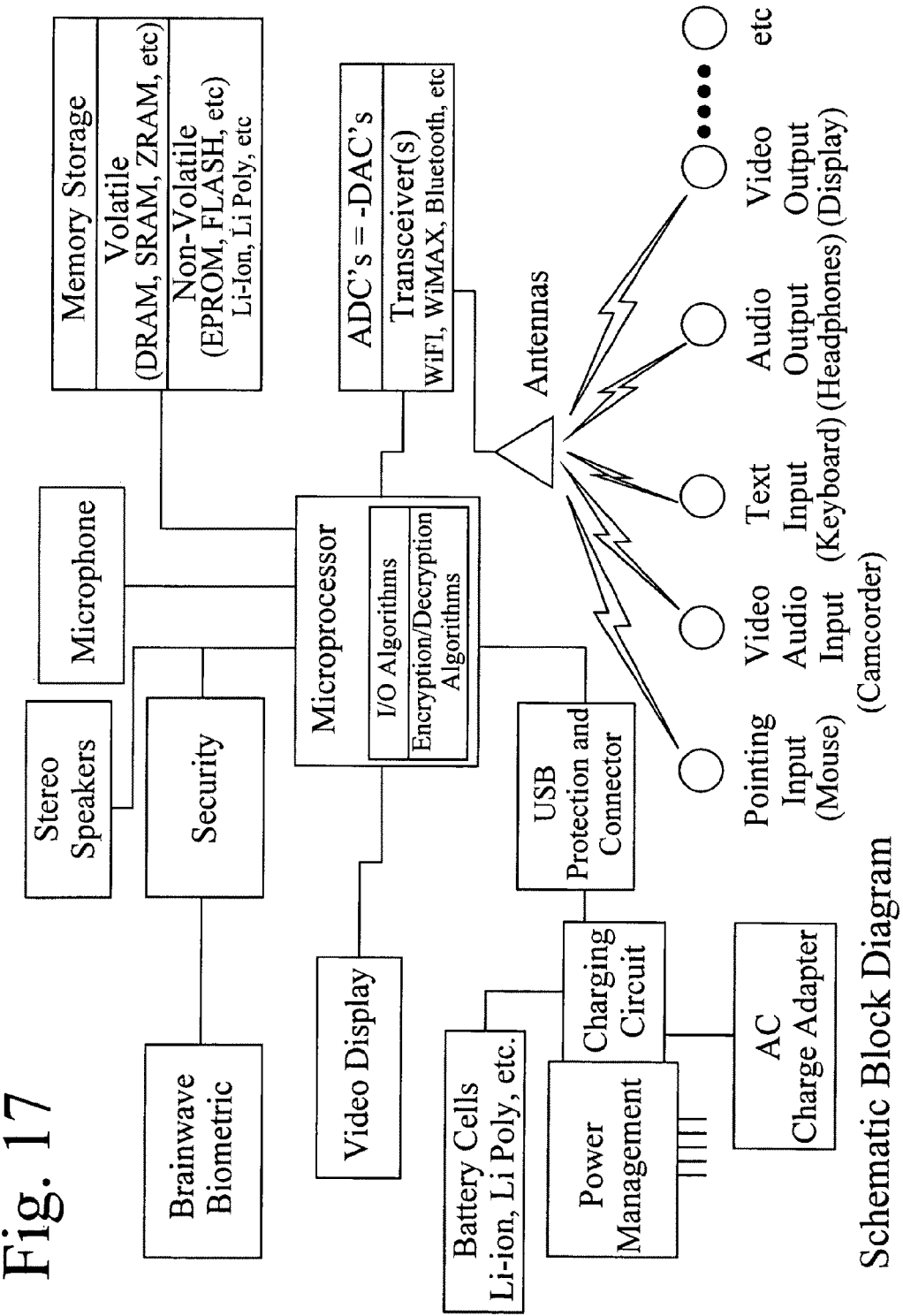

FIG. 17 is a schematic block diagram of the embodiment shown in FIG. 16.

Figure 18:
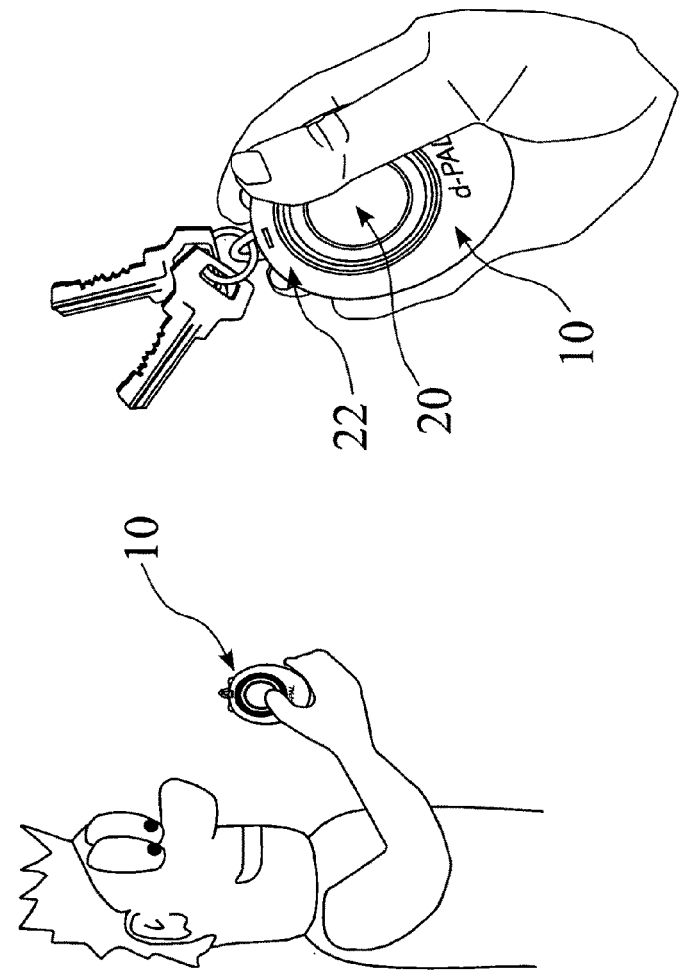
Figure 19:
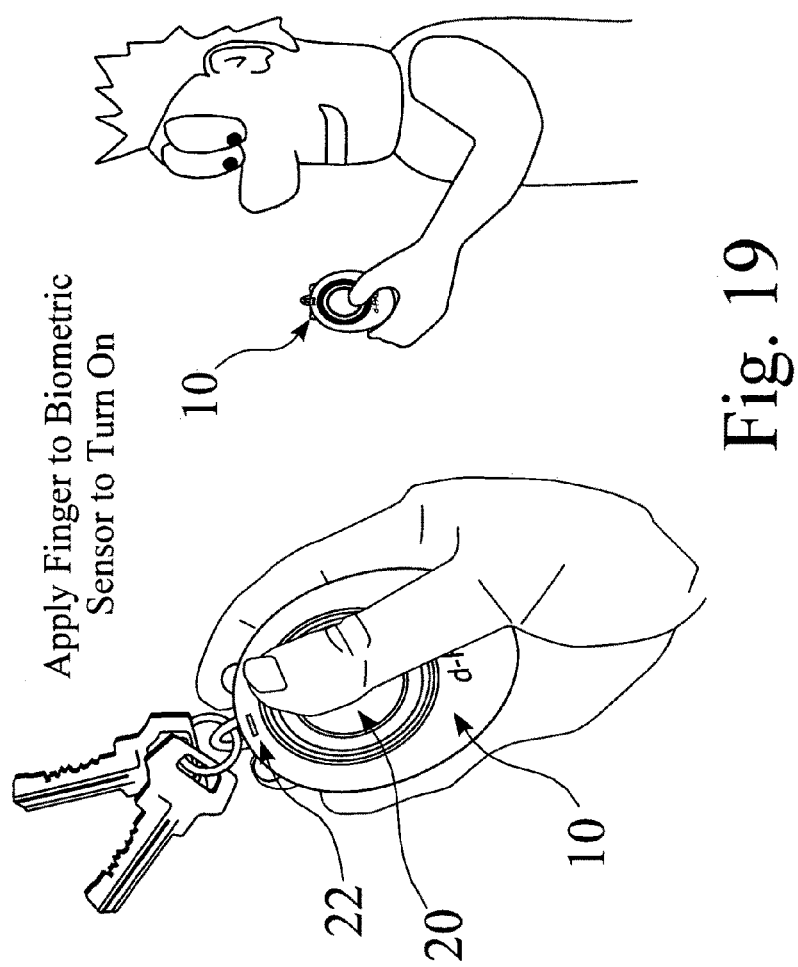

FIGS. 18 and 19 show how the invention may be activated.

Figure 20:
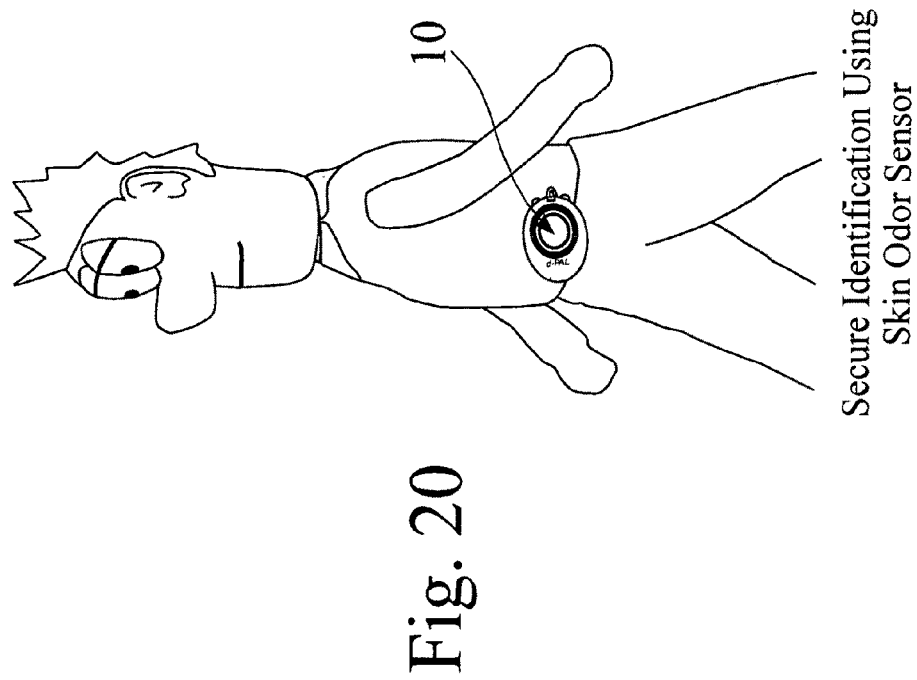

FIG. 20 reveals an embodiment of the invention which includes a skin odor sensor for secure identification.

Figure 21:
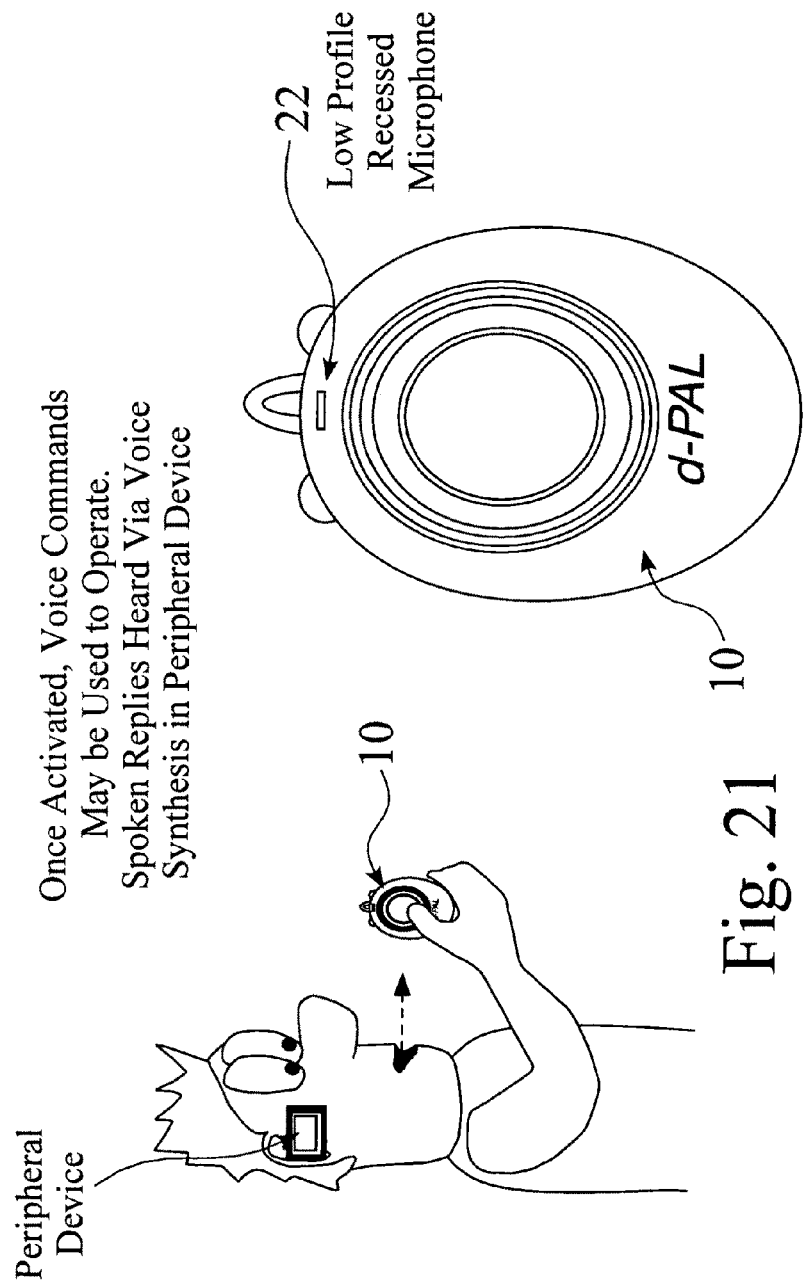

FIG. 21 shows how the invention may be operated with voice commands.

Figure 22:
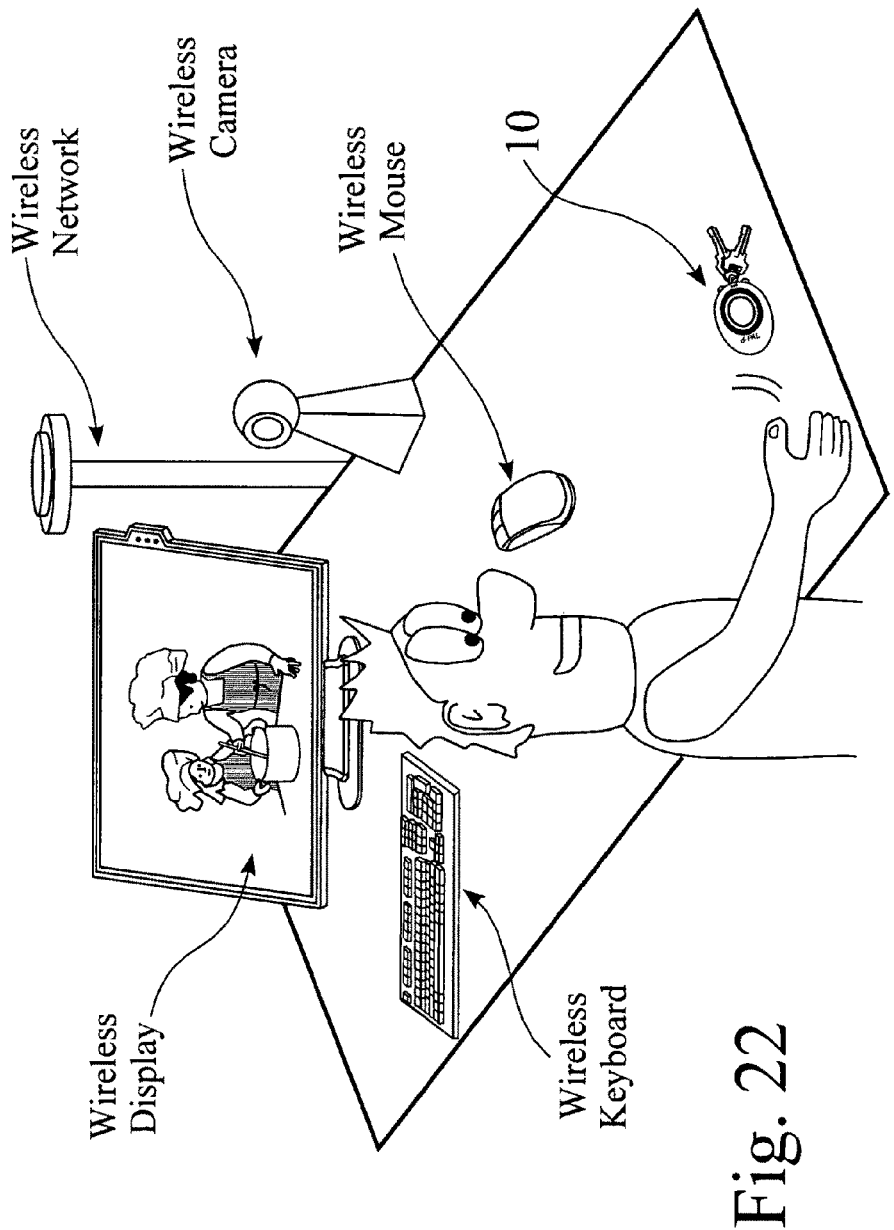

FIG. 22 supply a view of an individual using the invention with a variety of wireless devices and/or a wireless network.

Figure 23:
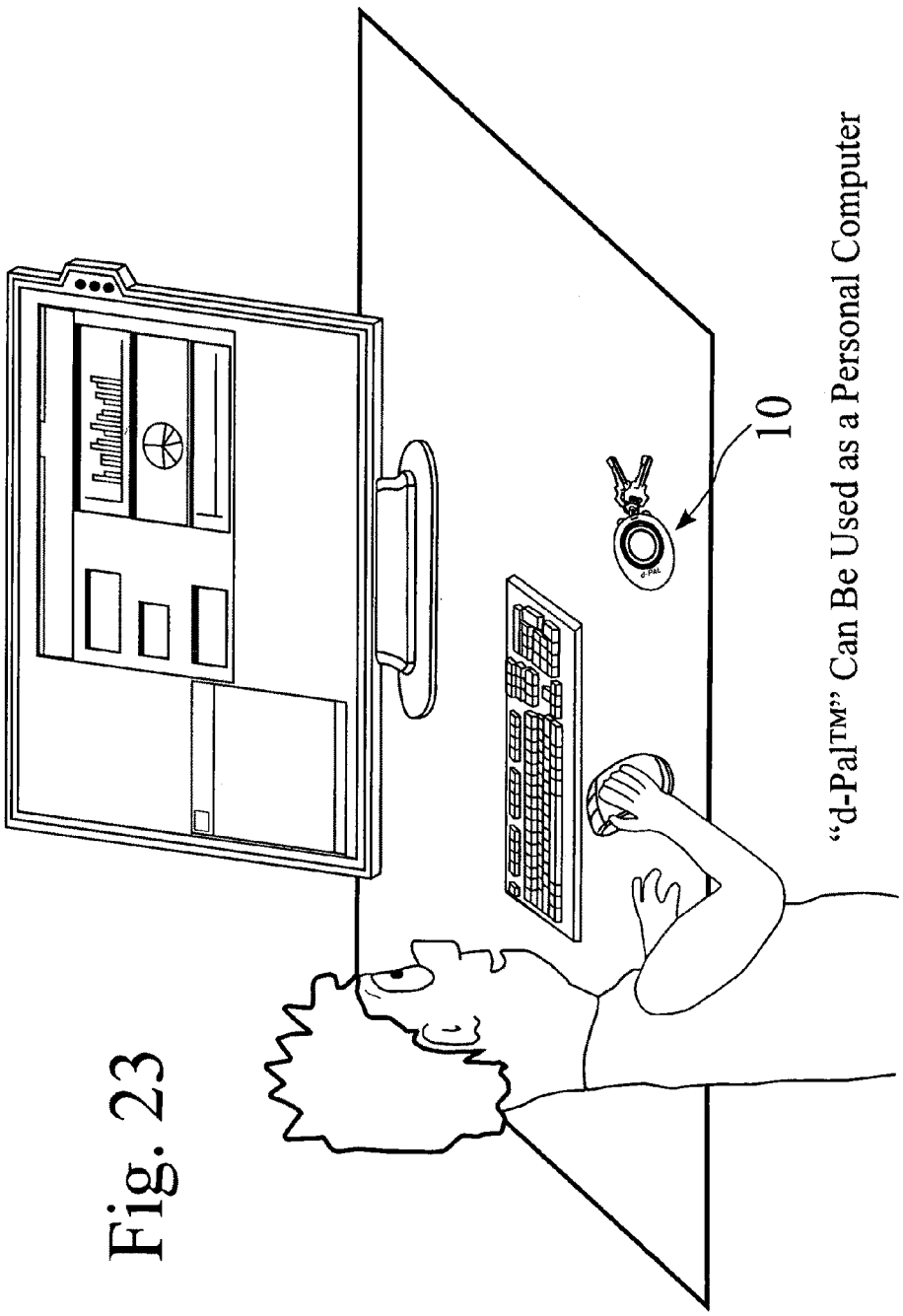

FIG. 23 shows how the invention may be used as a personal computer.

Figure 24:
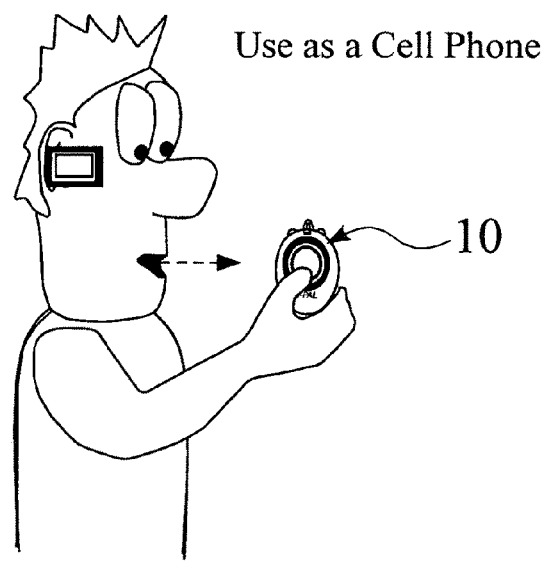

FIG. 24 shows how the invention may be used as a cellular telephone.

Figure 25:
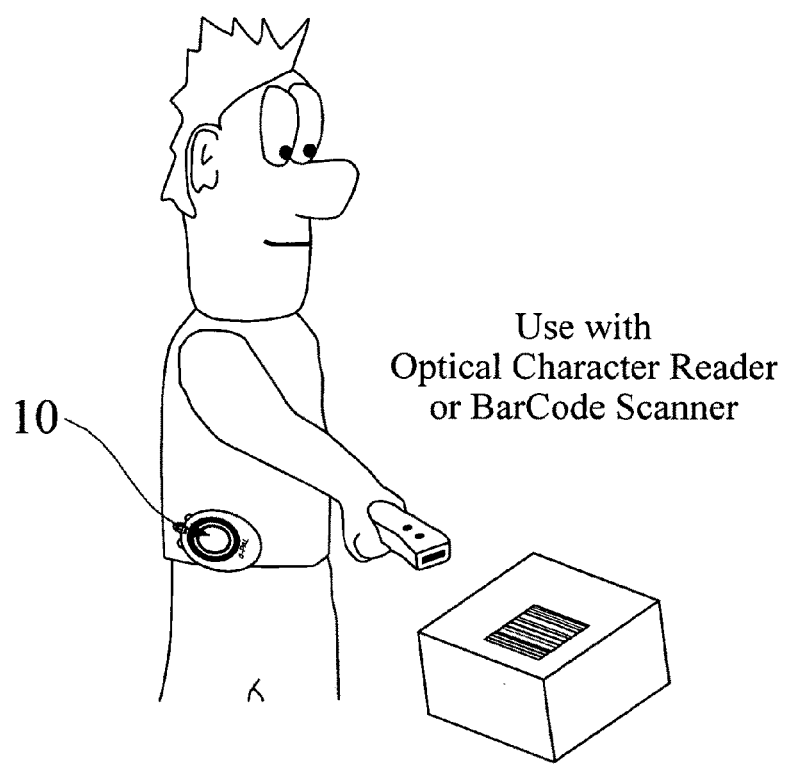

FIG. 25 depicts an embodiment of the invention which may be used with an optical character reader or bar code scanner.

Figure 26:
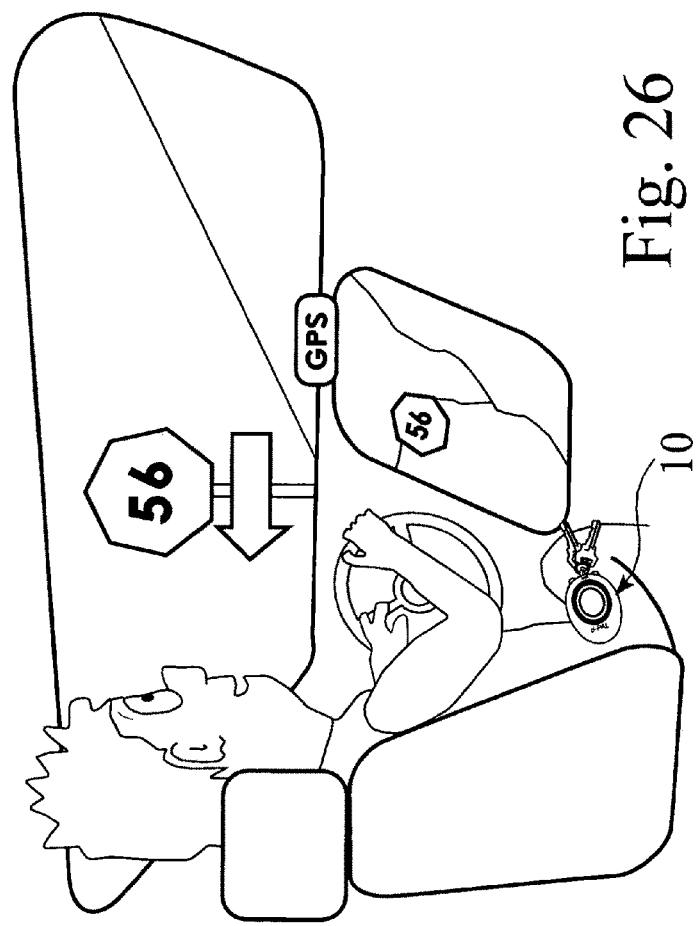

FIG. 26 offers a view of an embodiment of the invention which may be used with a navigation device.

Figure 27:
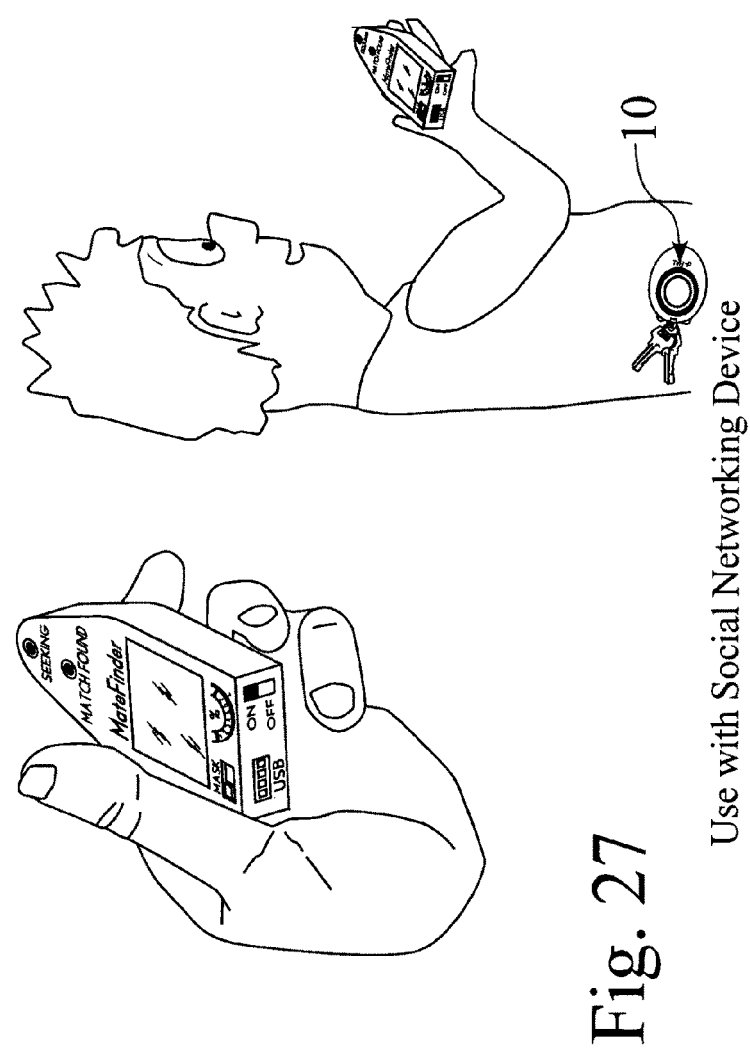

FIG. 27 supplies a view of an embodiment of the invention which may be used with a social networking device.

Figure 28:
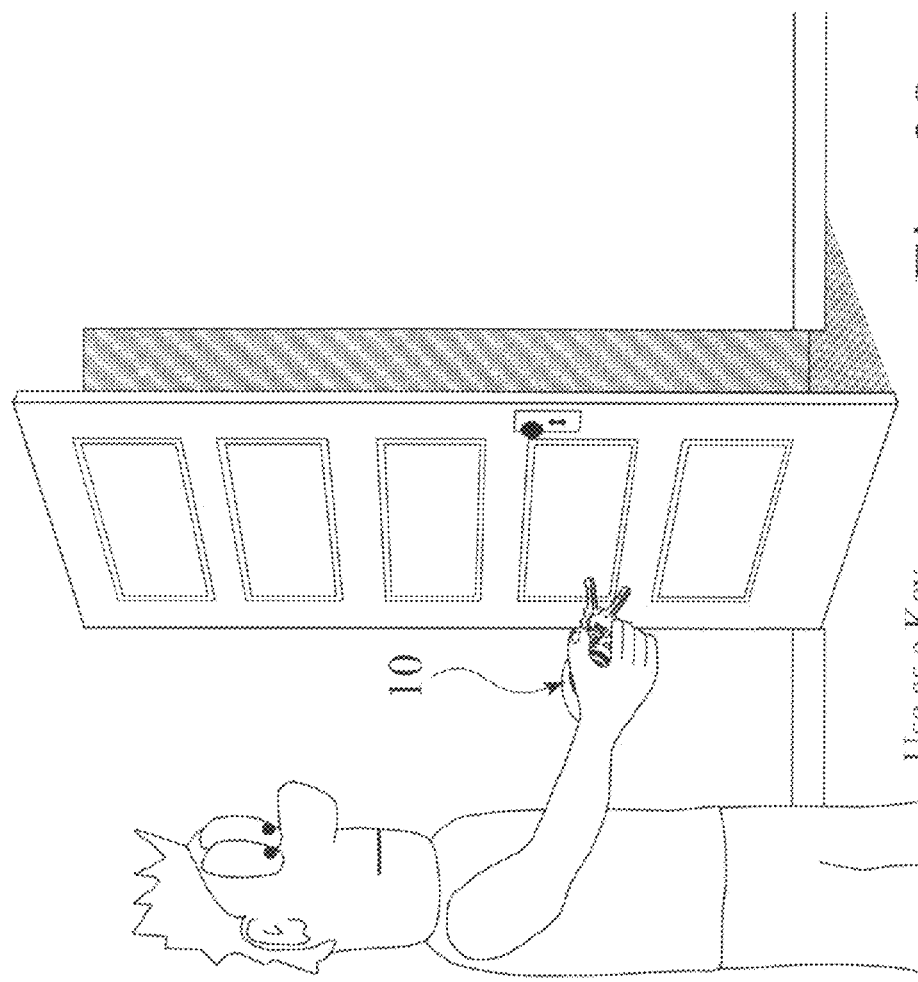

FIG. 28 provides a view of an embodiment of the invention which may be used as a key.

Figure 29:
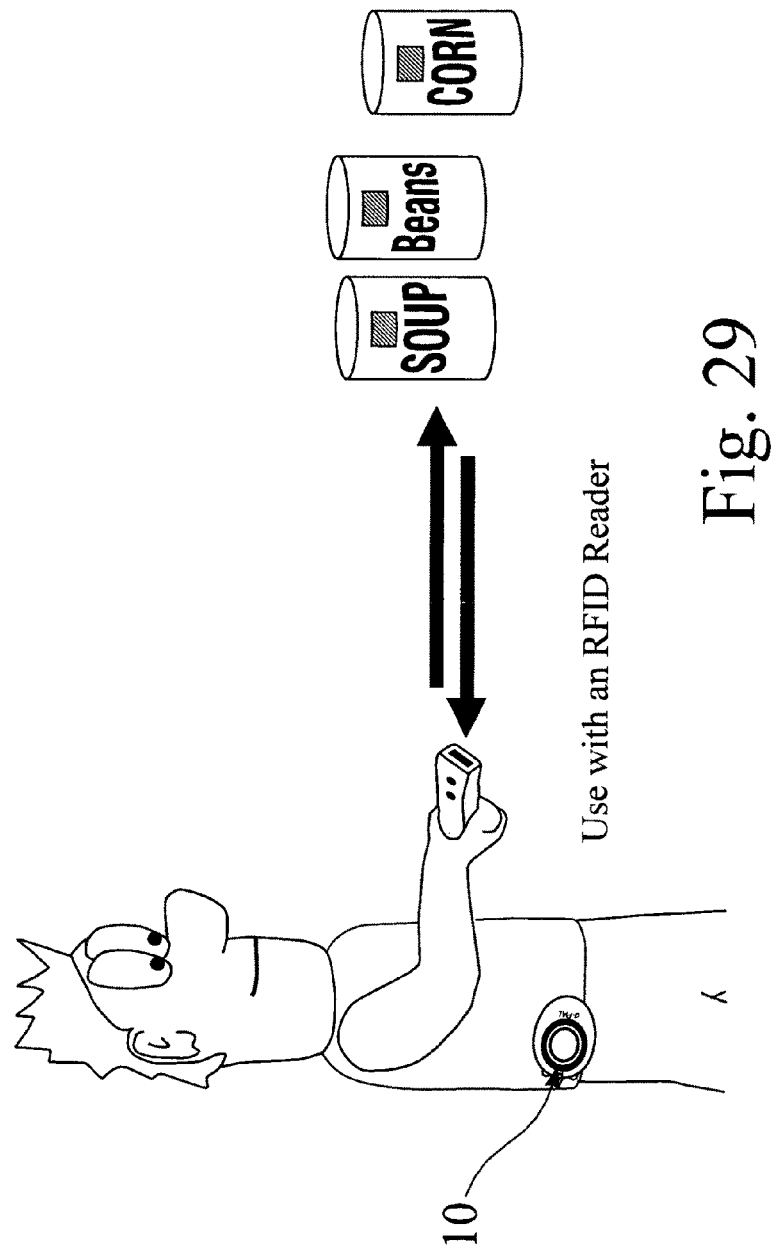

FIG. 29 illustrates an embodiment of the invention which may be used in combination with an RFID reader.

Figure 30:
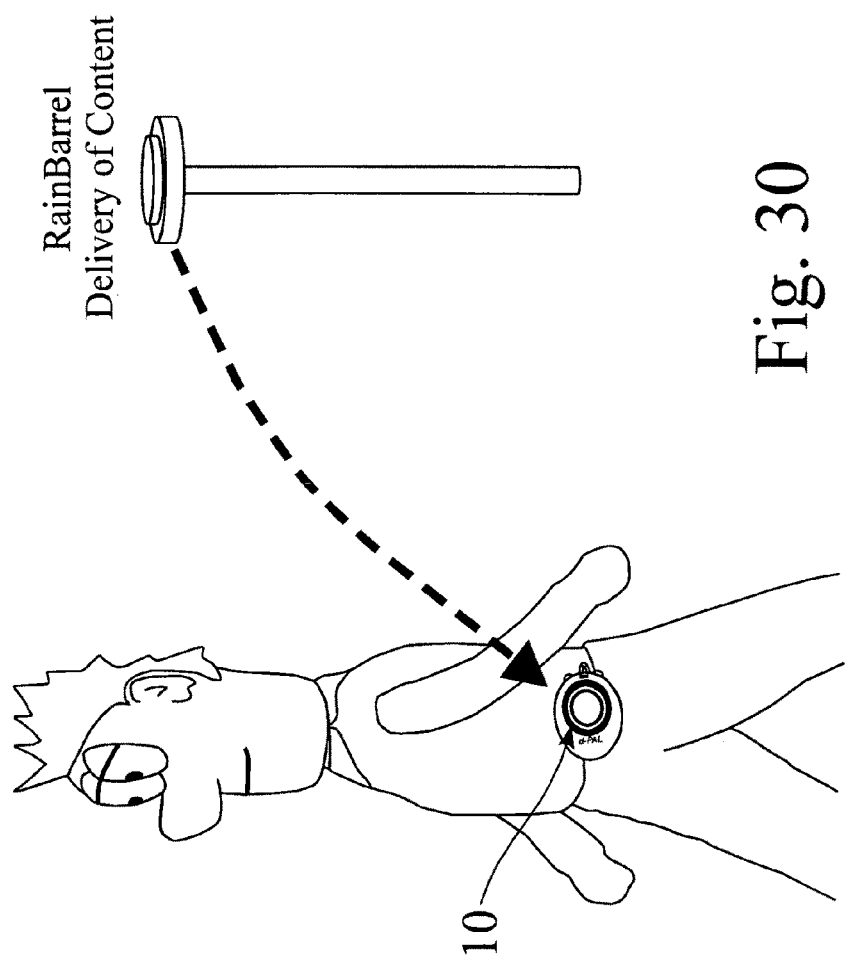

FIG. 30 portrays an embodiment of the invention which may be used to receive and to store content which has been automatically and wirelessly delivered to the d-Pal.

Figure 31:
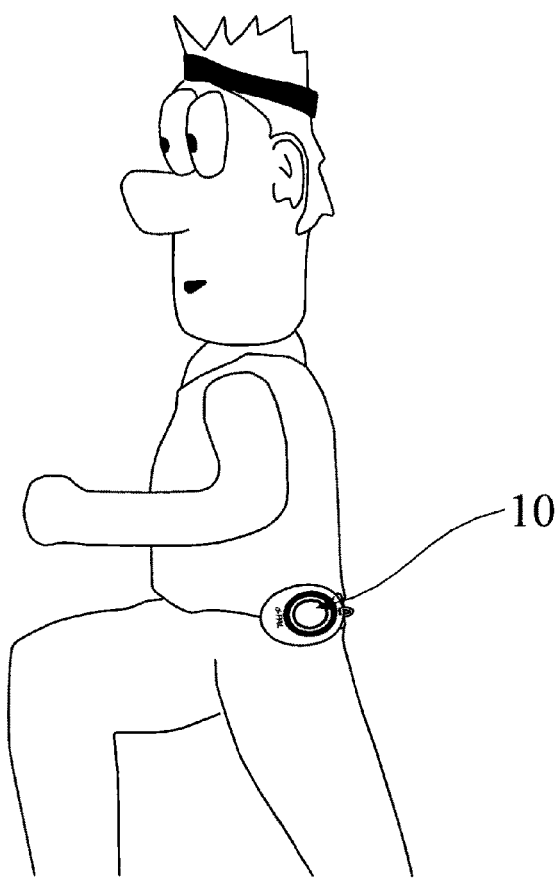

FIG. 31 is a view of an embodiment of the invention which may be used as a pedometer or health monitor.

Figure 32:
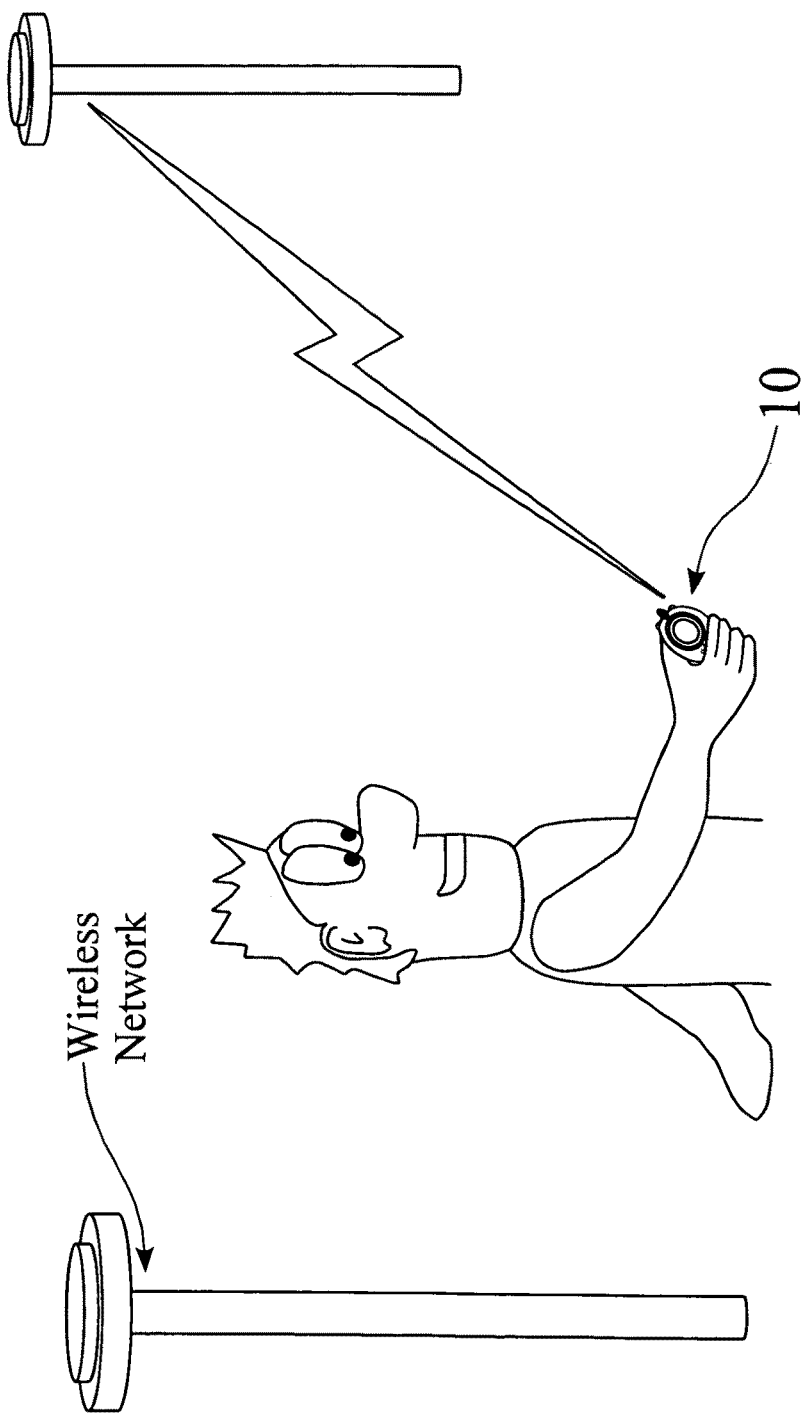

FIG. 32 portrays an embodiment of the invention which may be used to receive automatic backups, downloads and datacasts.

Figure 33:
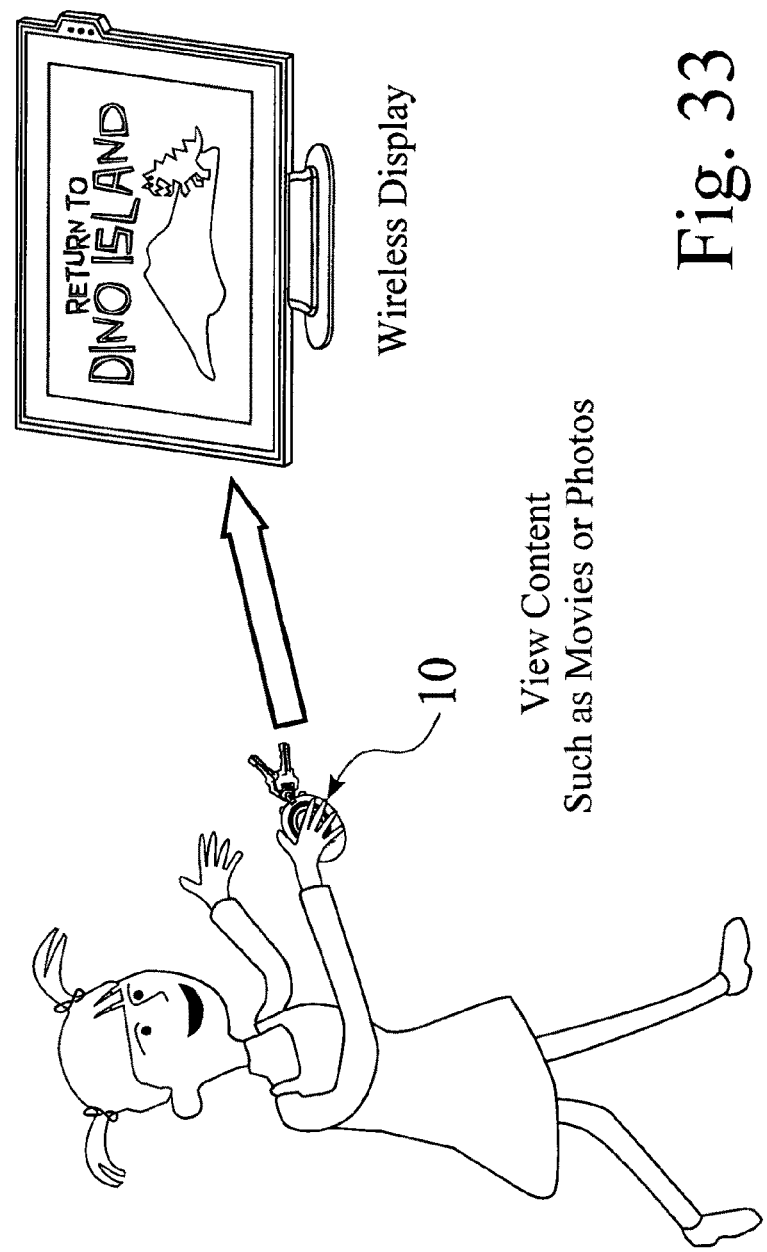

FIG. 33 illustrates the use of the invention for viewing content, such as movies, videos or photos.

Figure 34:
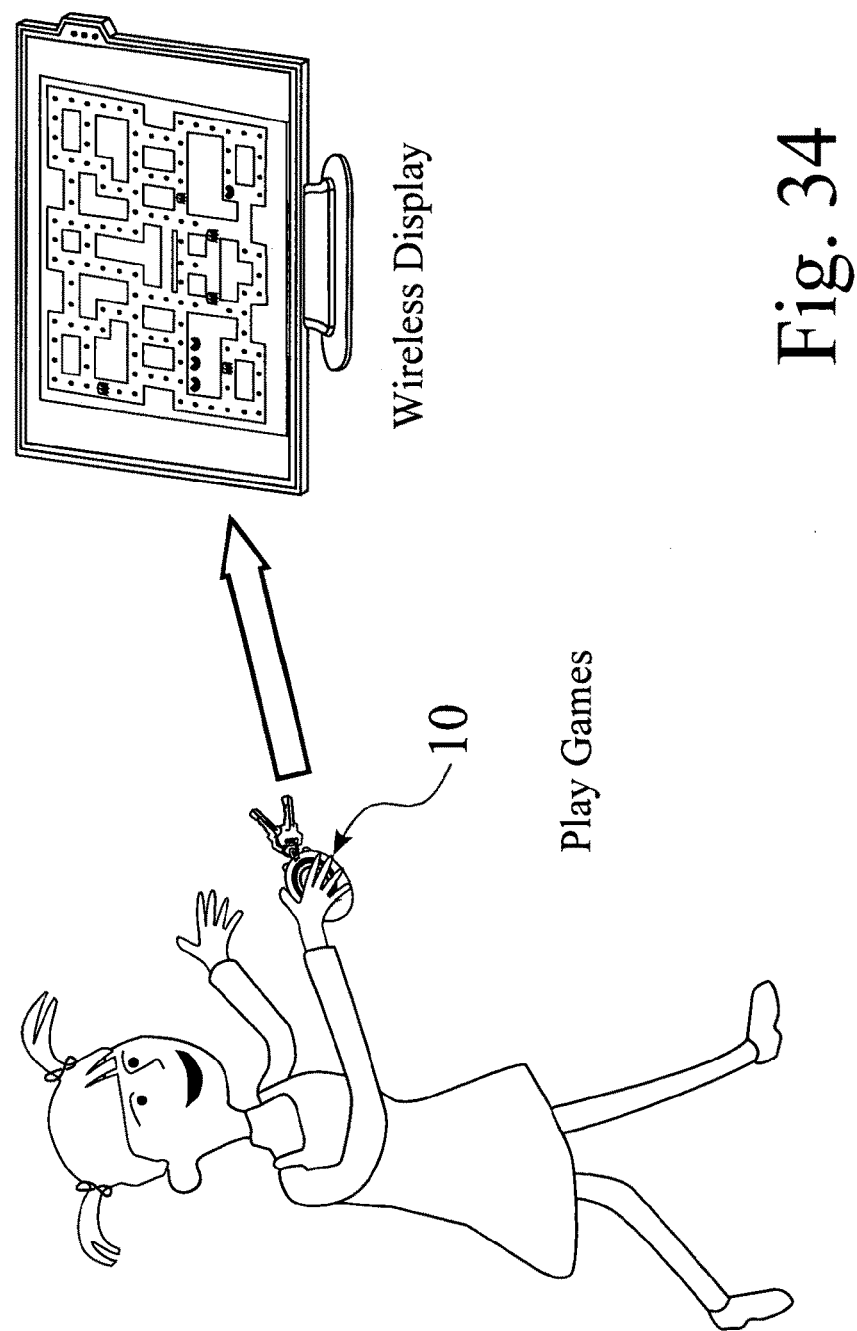

FIG. 34 illustrates the use of the invention for playing games.

Figure 35:
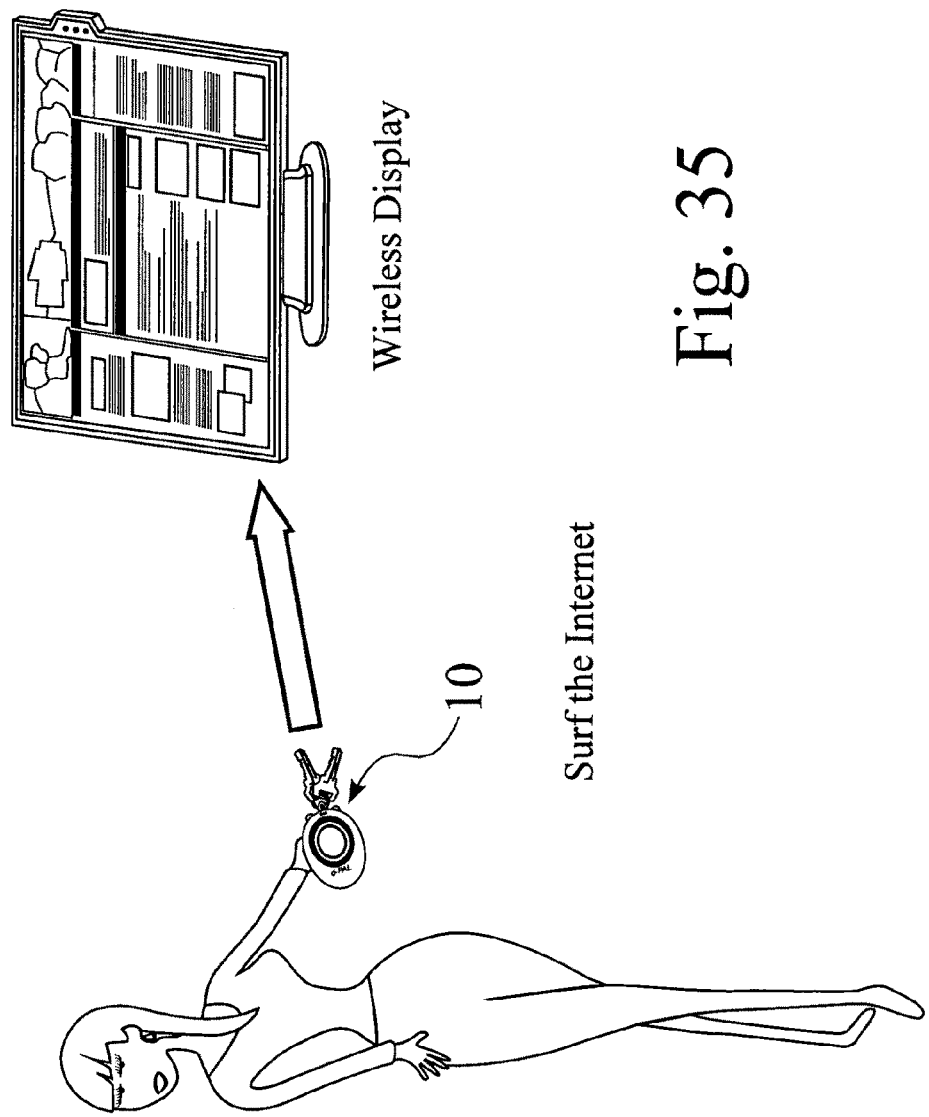

FIG. 35 illustrates the use of the invention for surfing the Internet.

Figure 36:
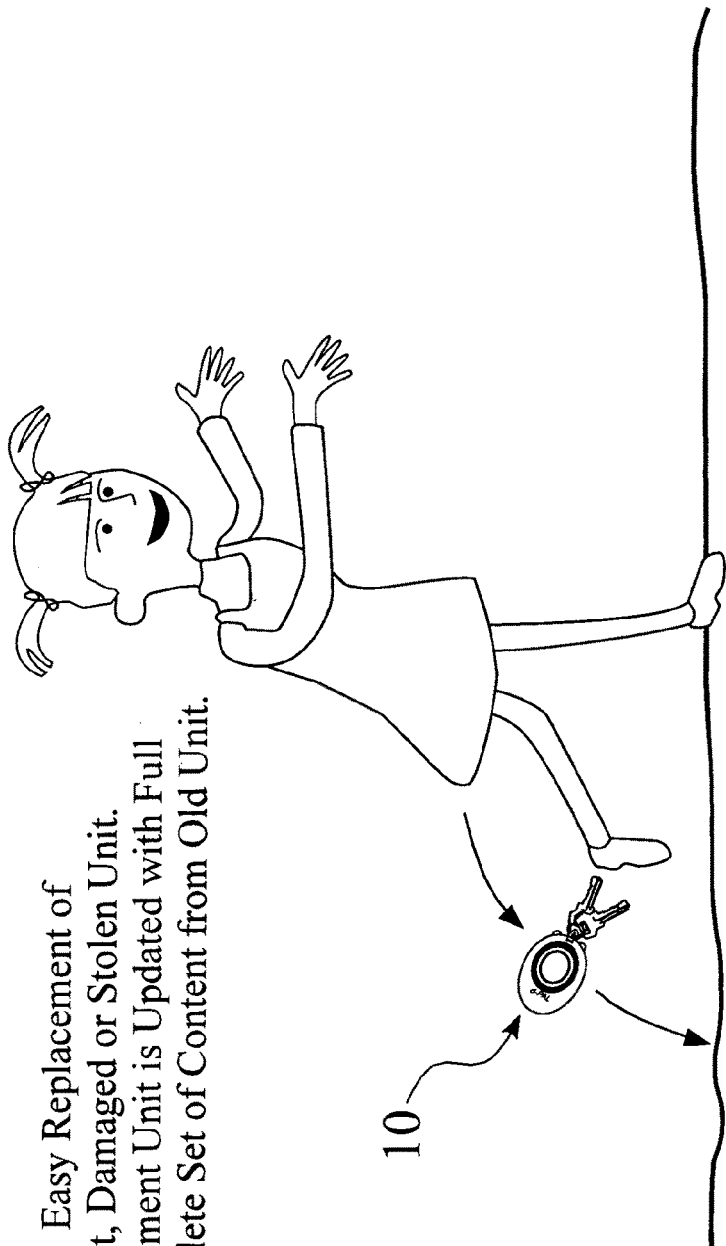

FIG. 36 shows that lost or missing unit may be easily replaced with a new unit that contains all the original data stored on the lost or missing unit.

Figure 37:
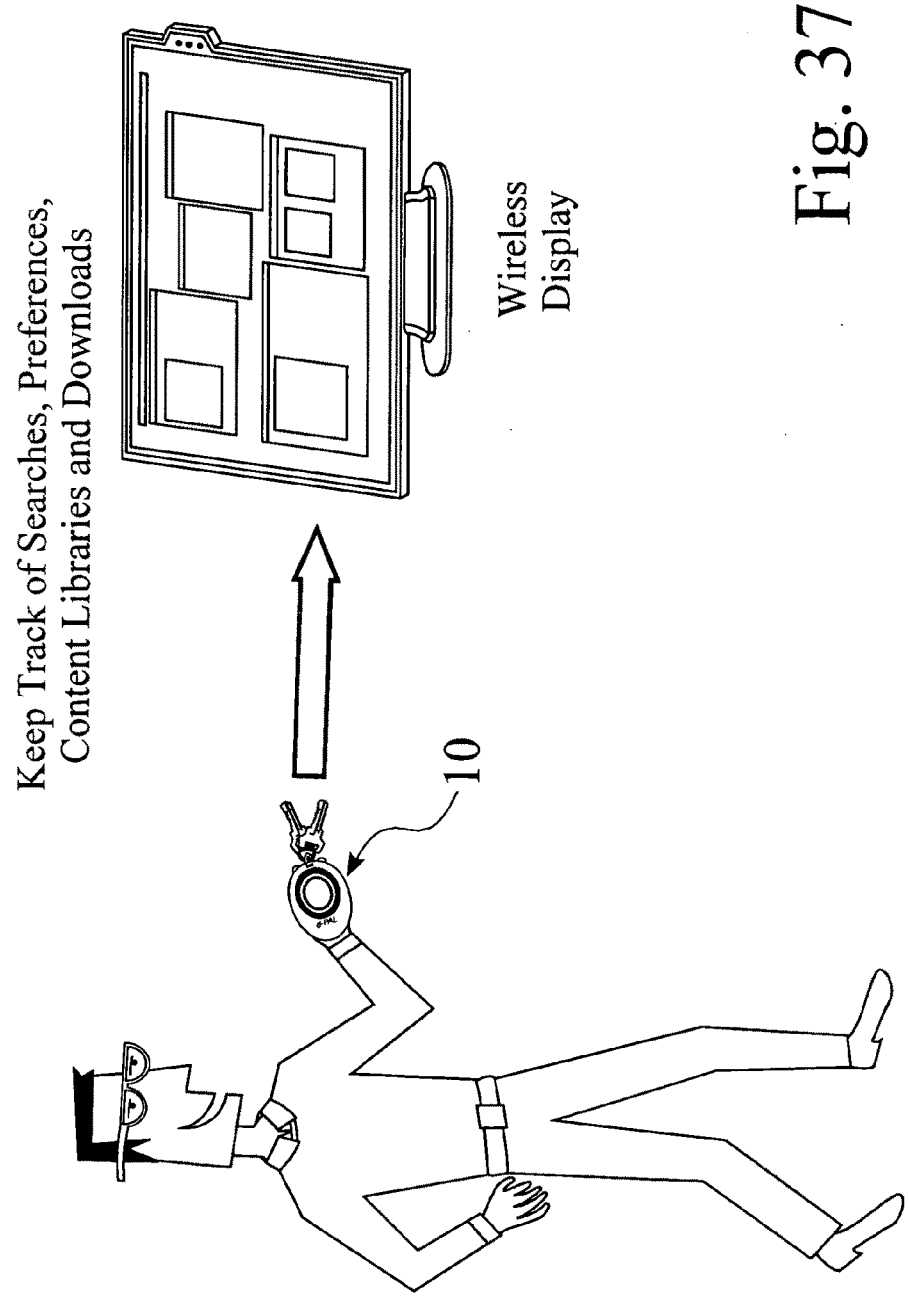

FIG. 37 shows how the invention may be used to keep track of searches, preferences, content libraries and/or downloads.

Figure 38:
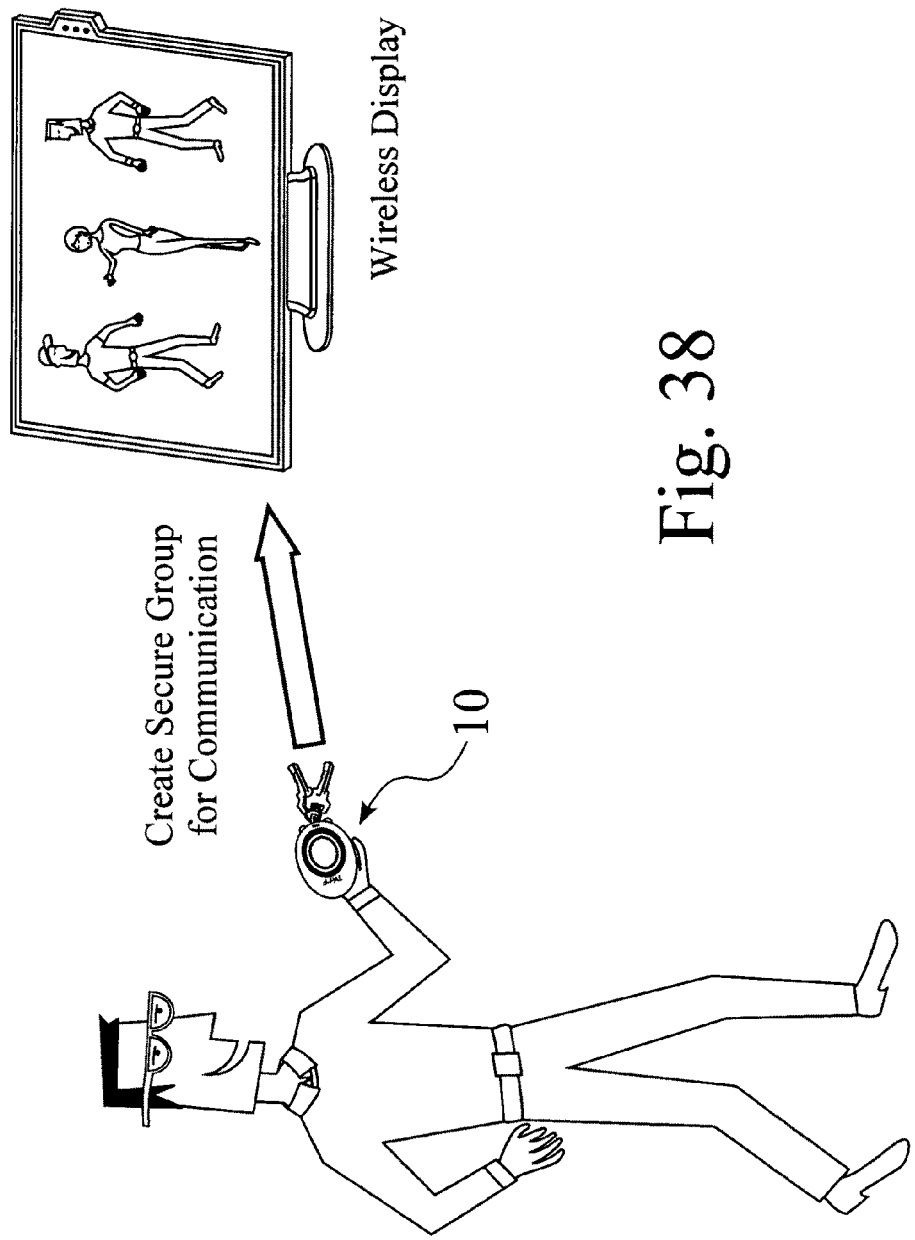

FIG. 38 shows how the invention may be used to create secure groups for communications.

Figure 39:
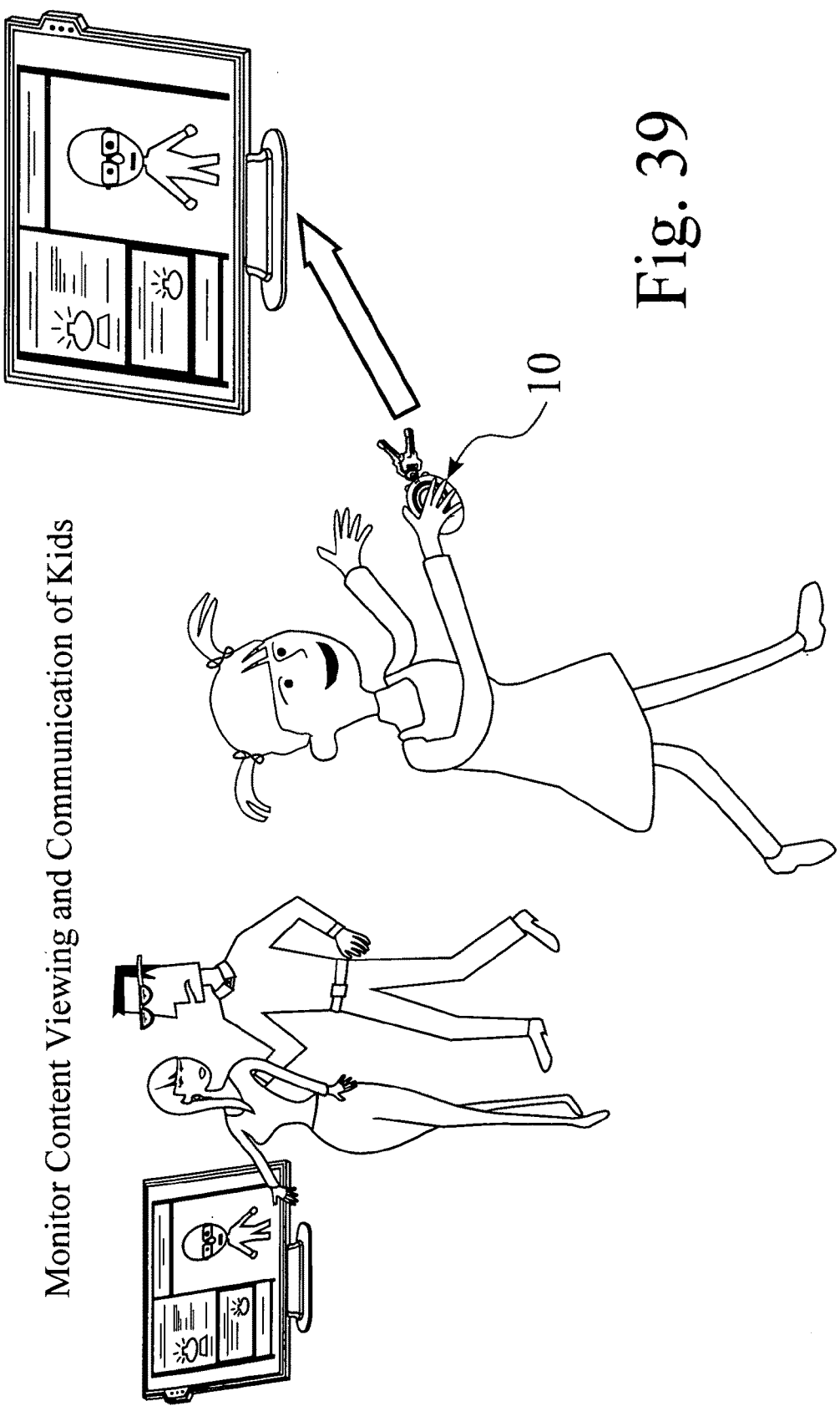

FIG. 39 shows how the invention may be used to monitor content viewing and communication of children.

Figure 40:
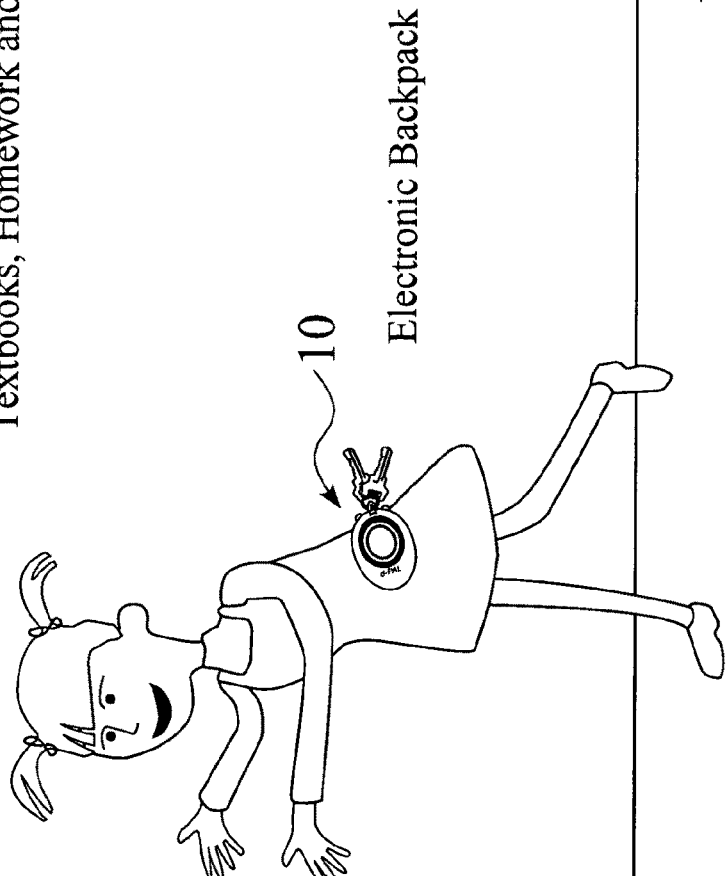
Figure 41:
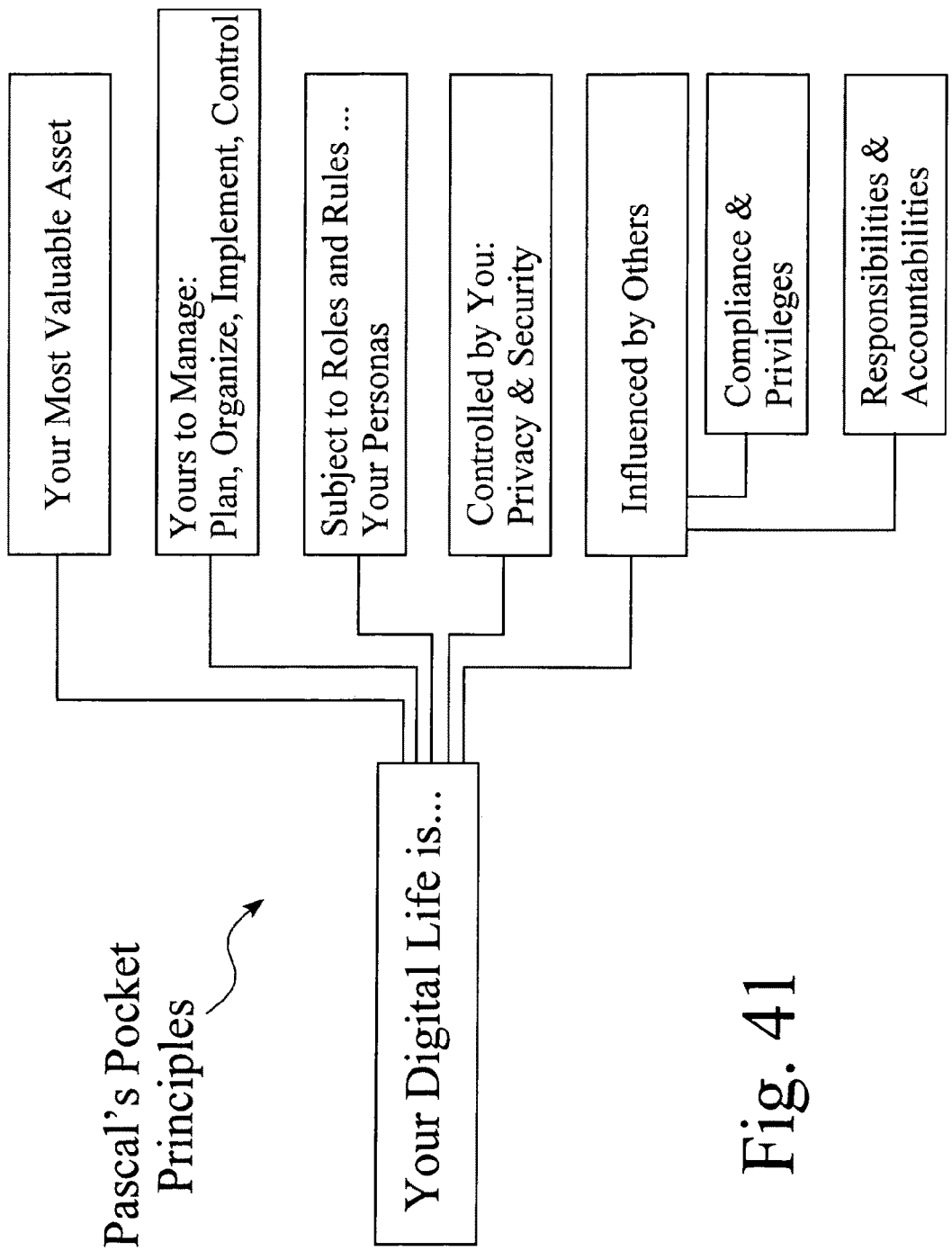
Figure 42:
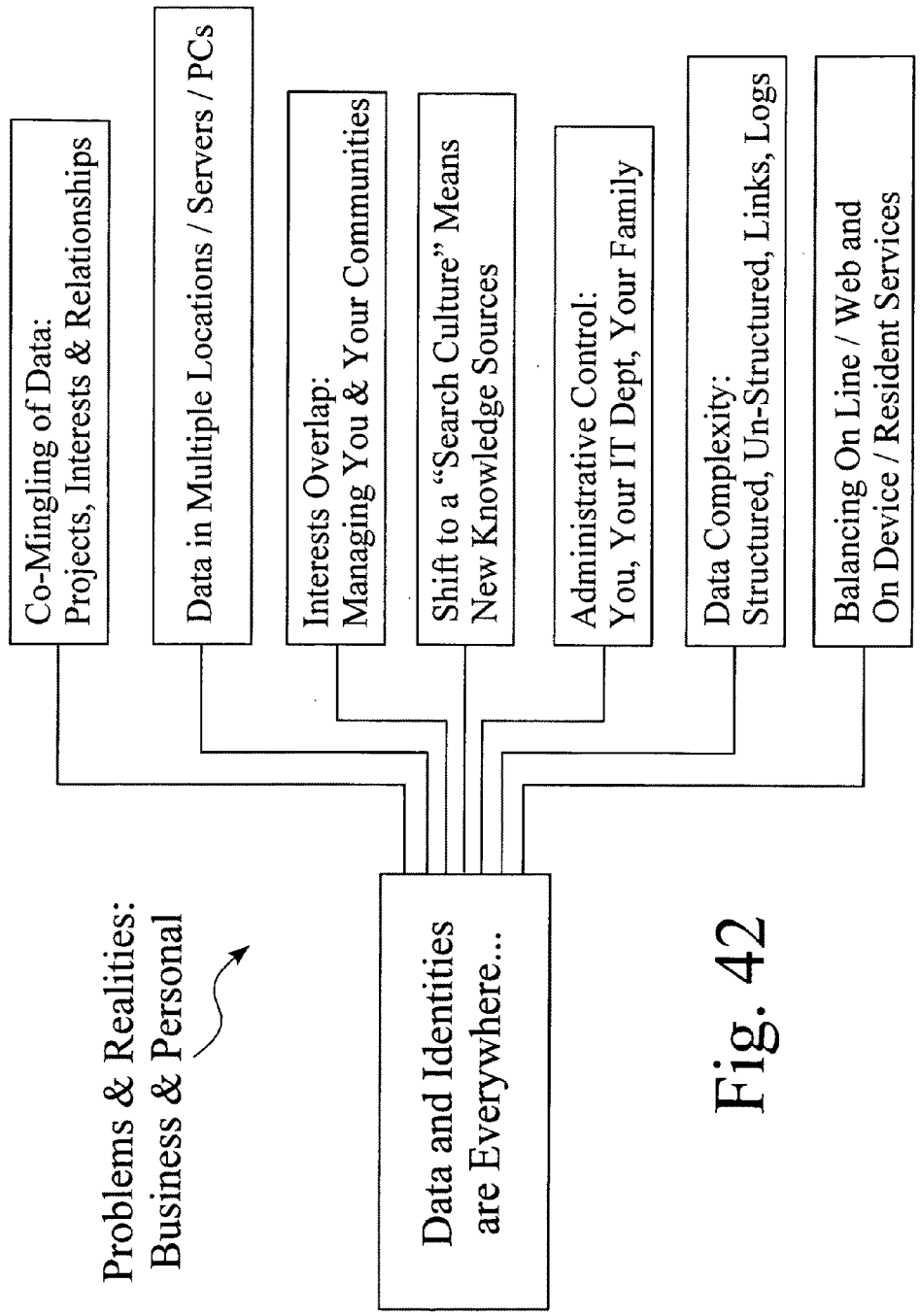
Figure 43:
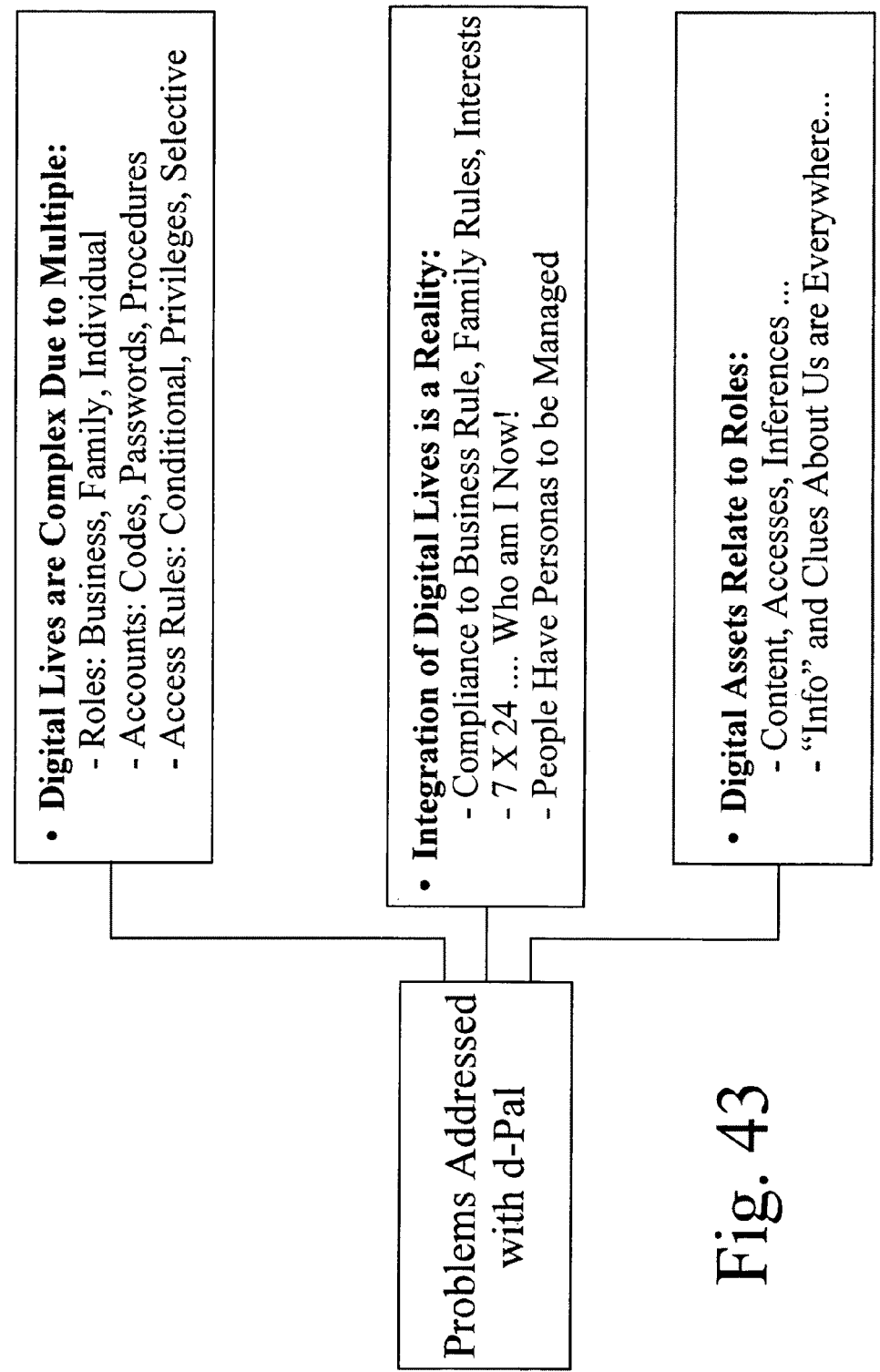
Figure 44:
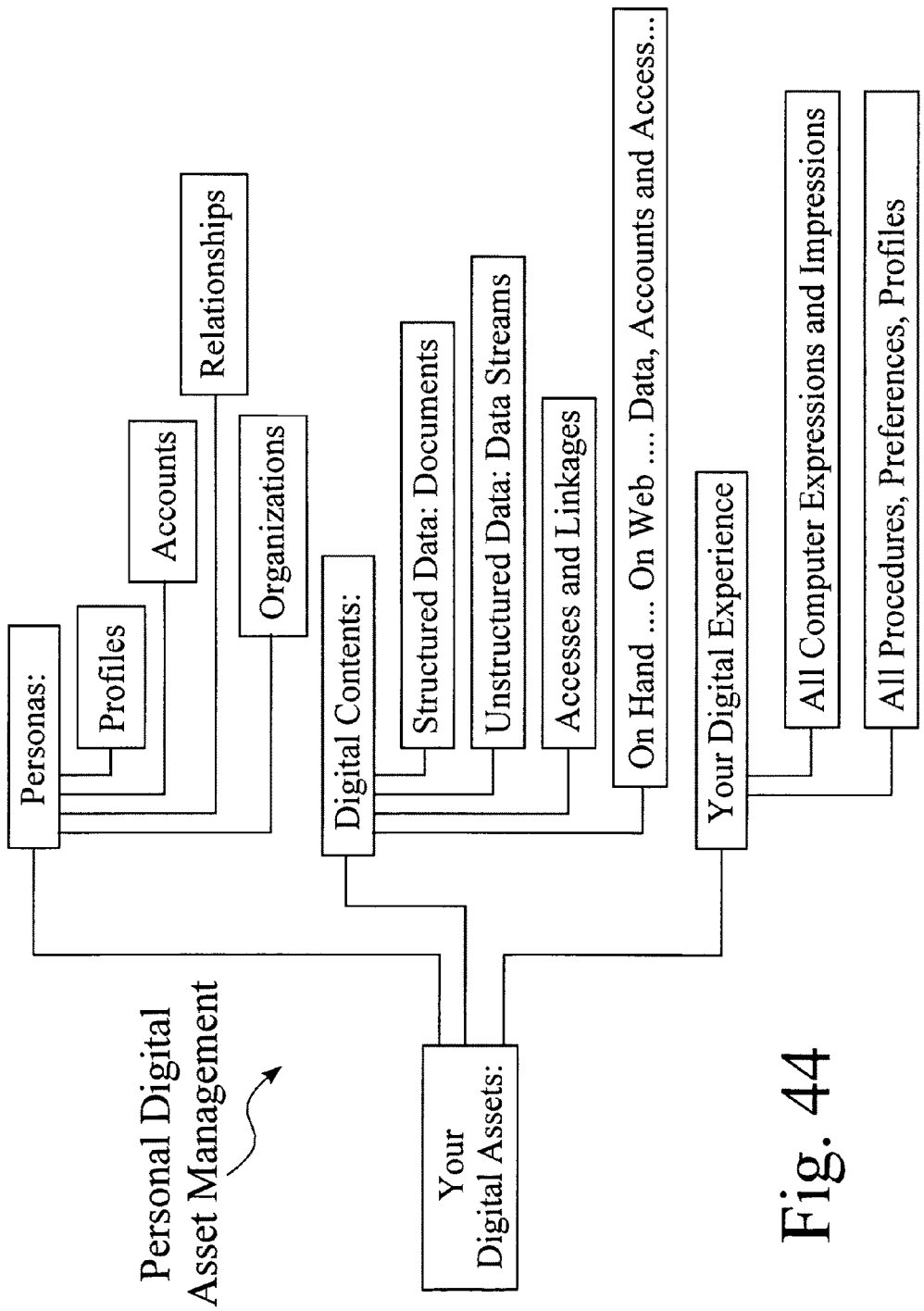
Figure 45:
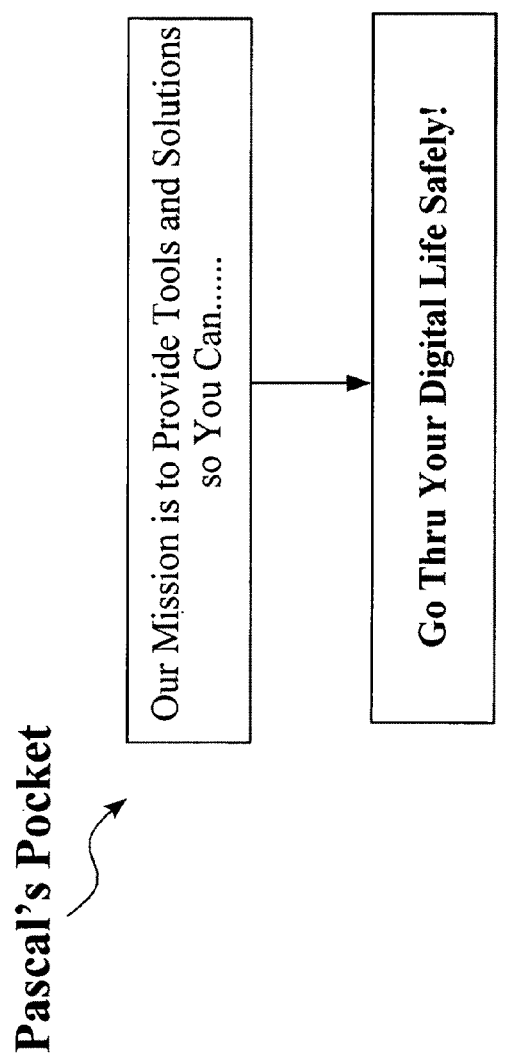
Figure 46:
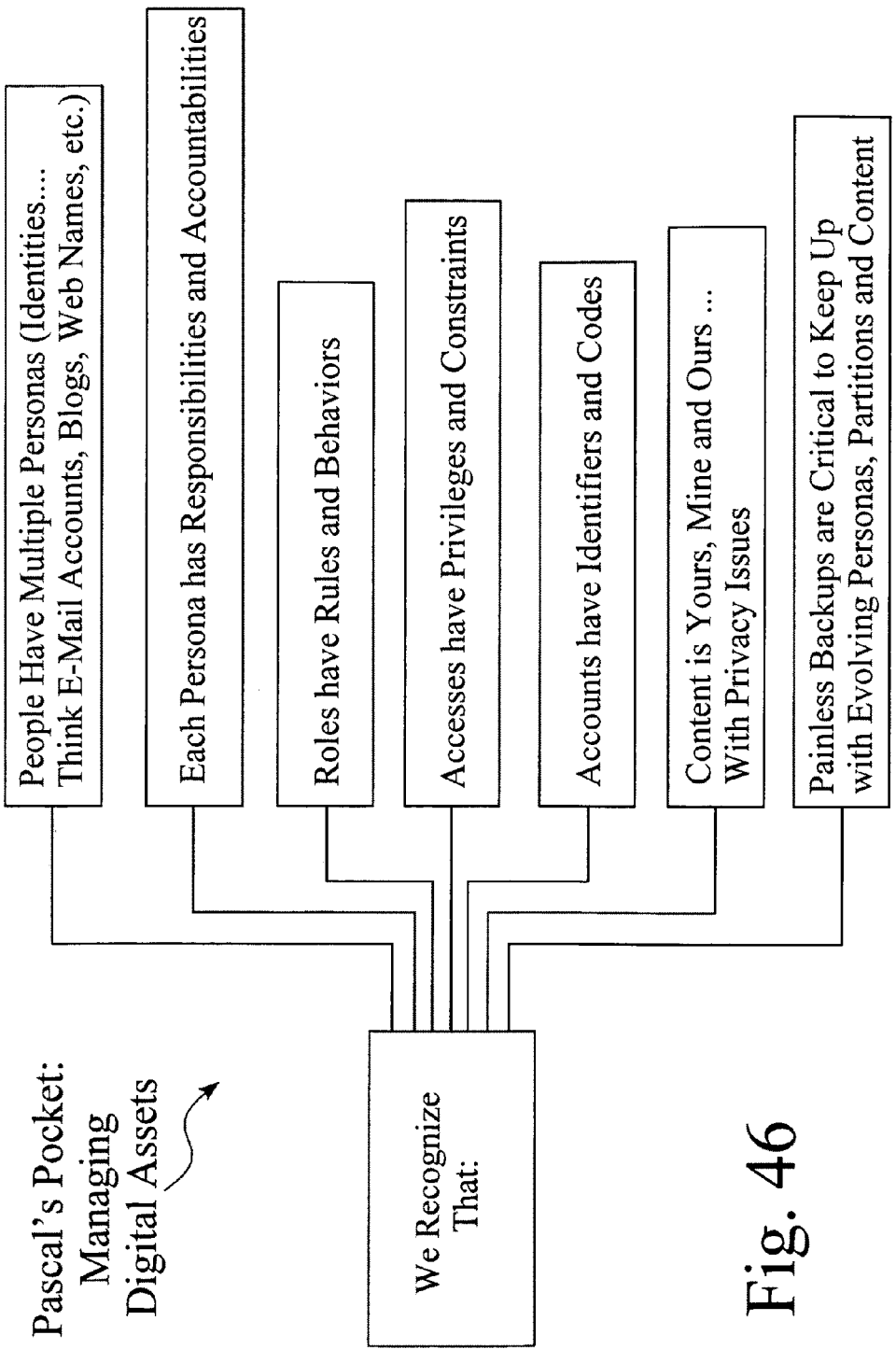
Figure 47:
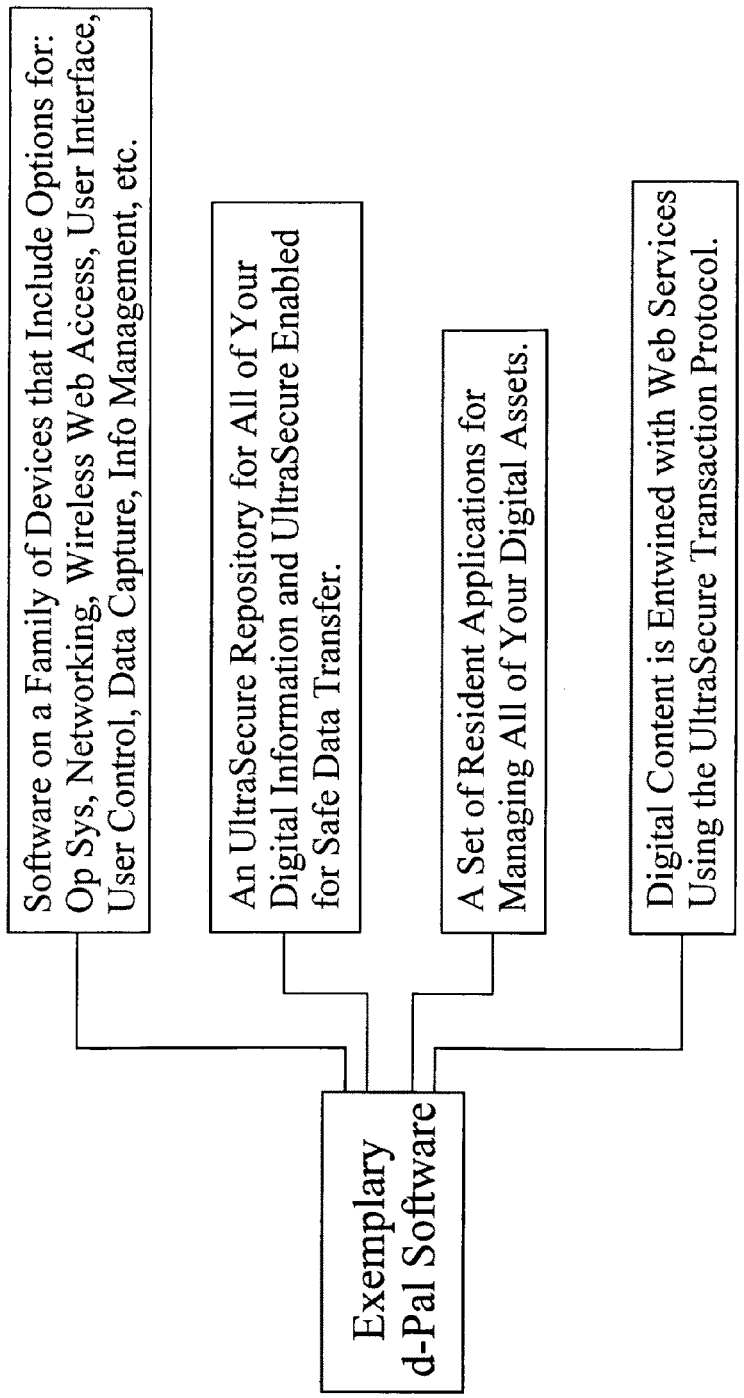
Figure 50:
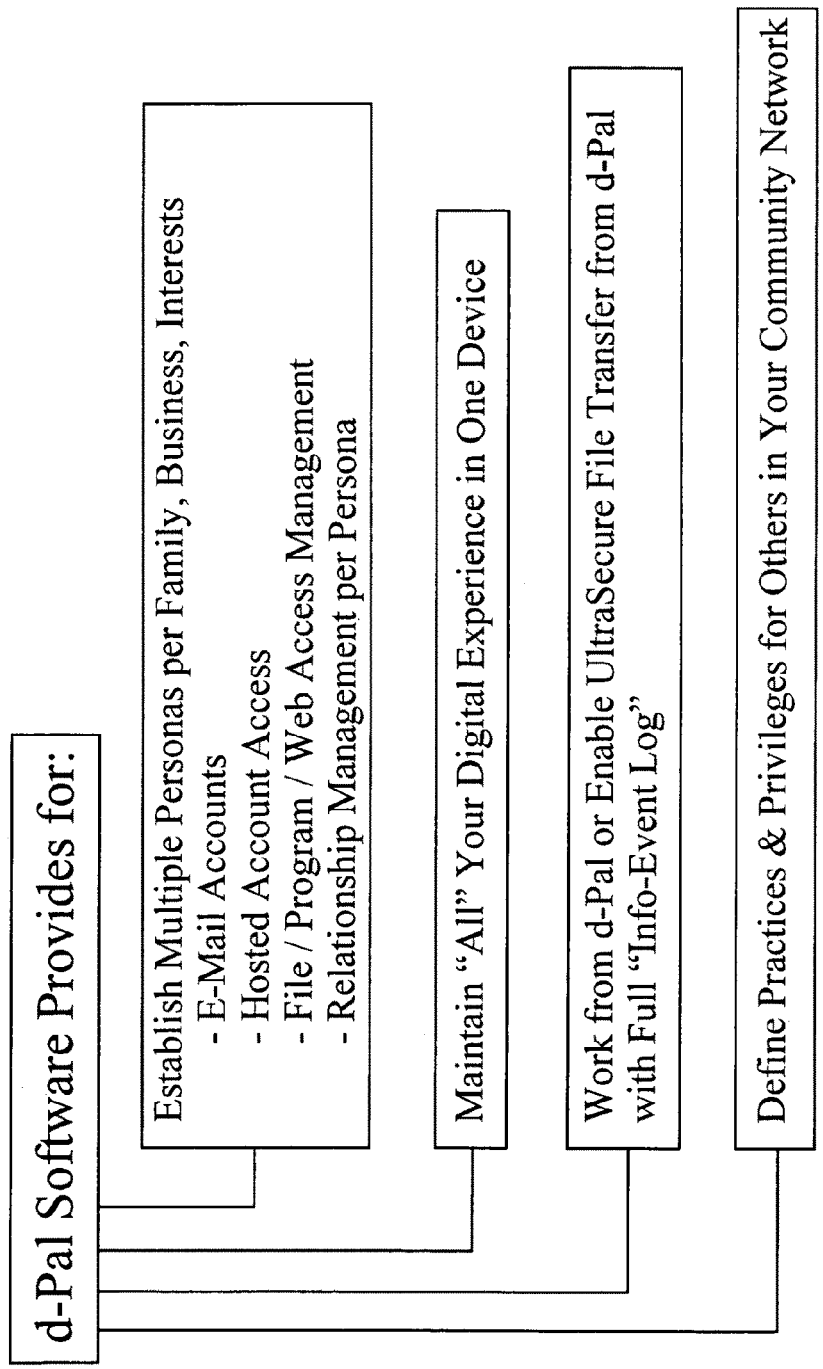
Figure 51:
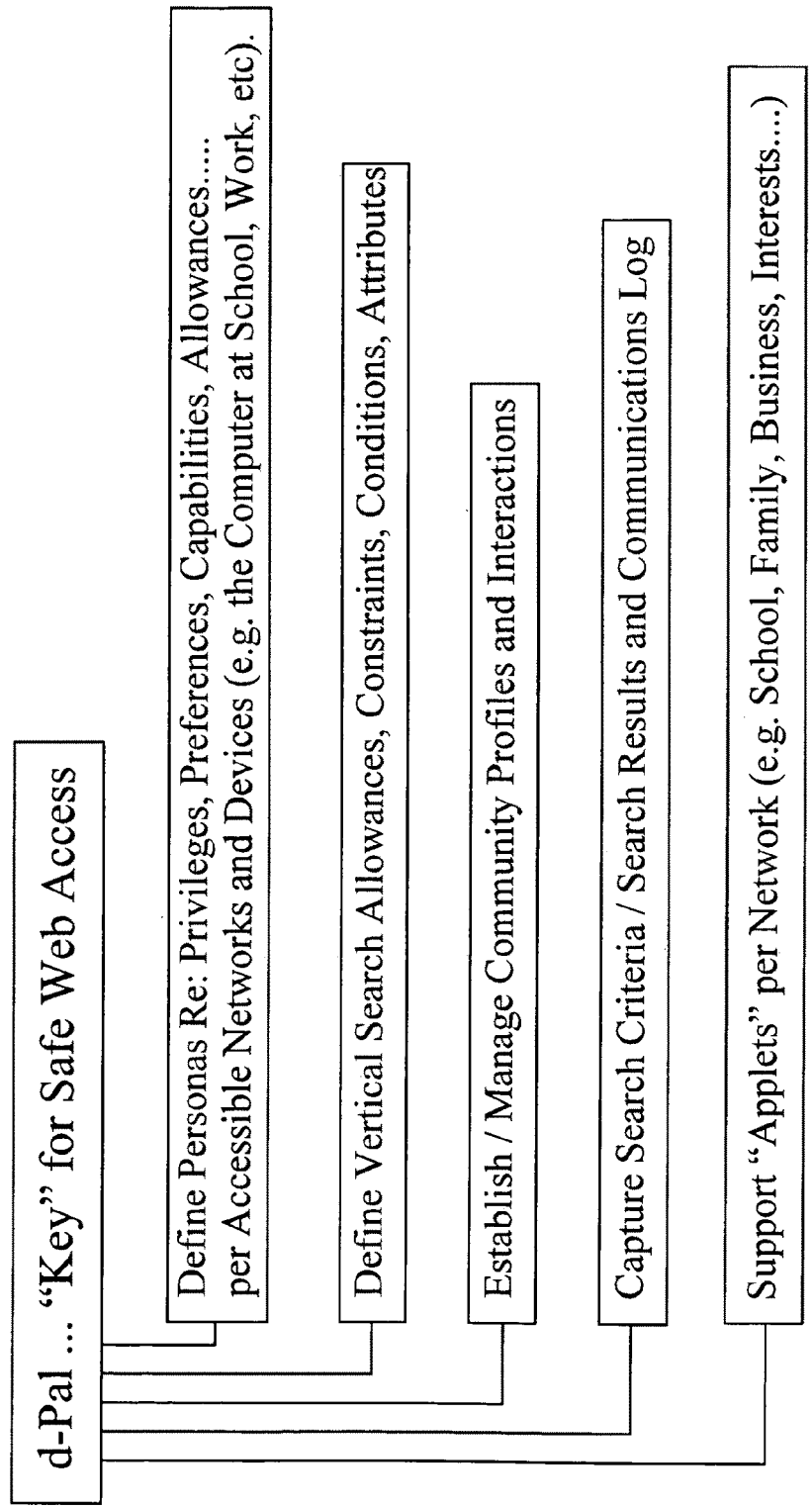
Figure 53:
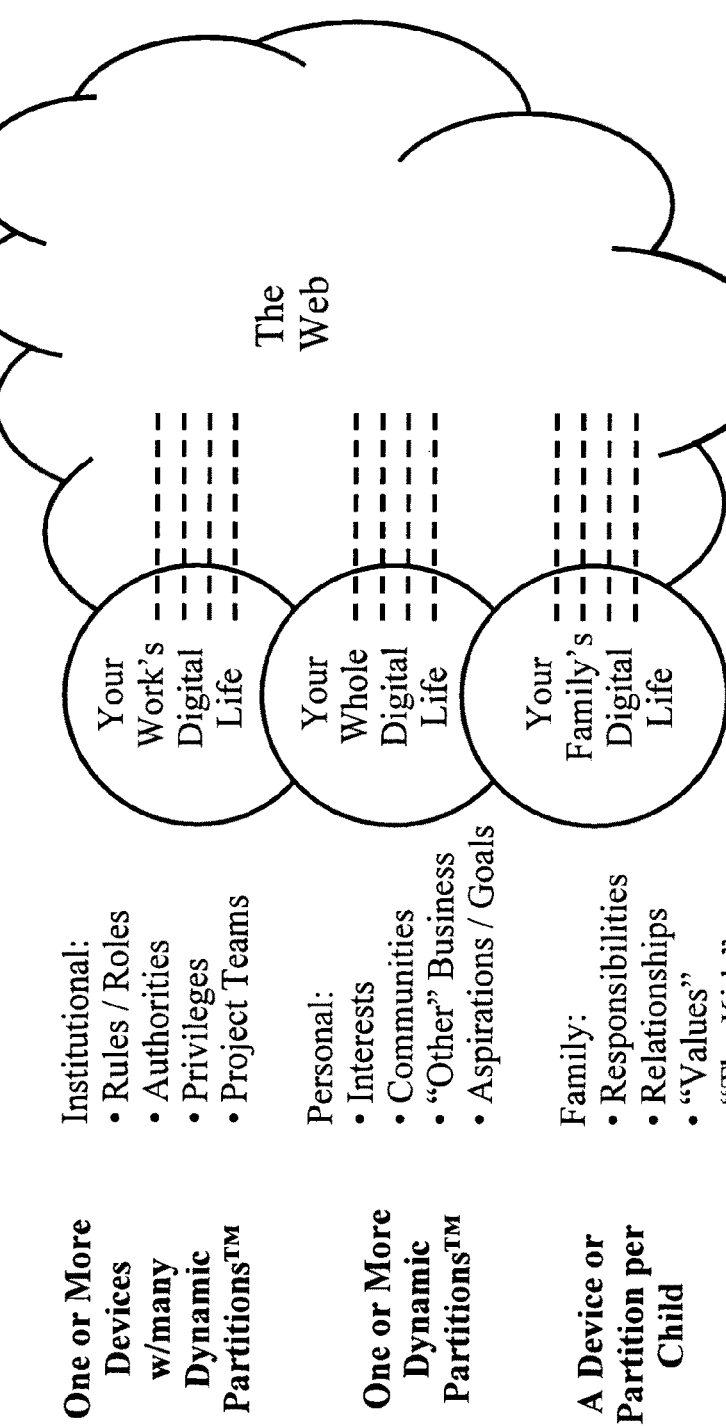

FIG. 40 shows how the invention may be used as an electronic backpack.

FIGS. 41-53 describe alternative embodiments of the invention.

Figure 54:
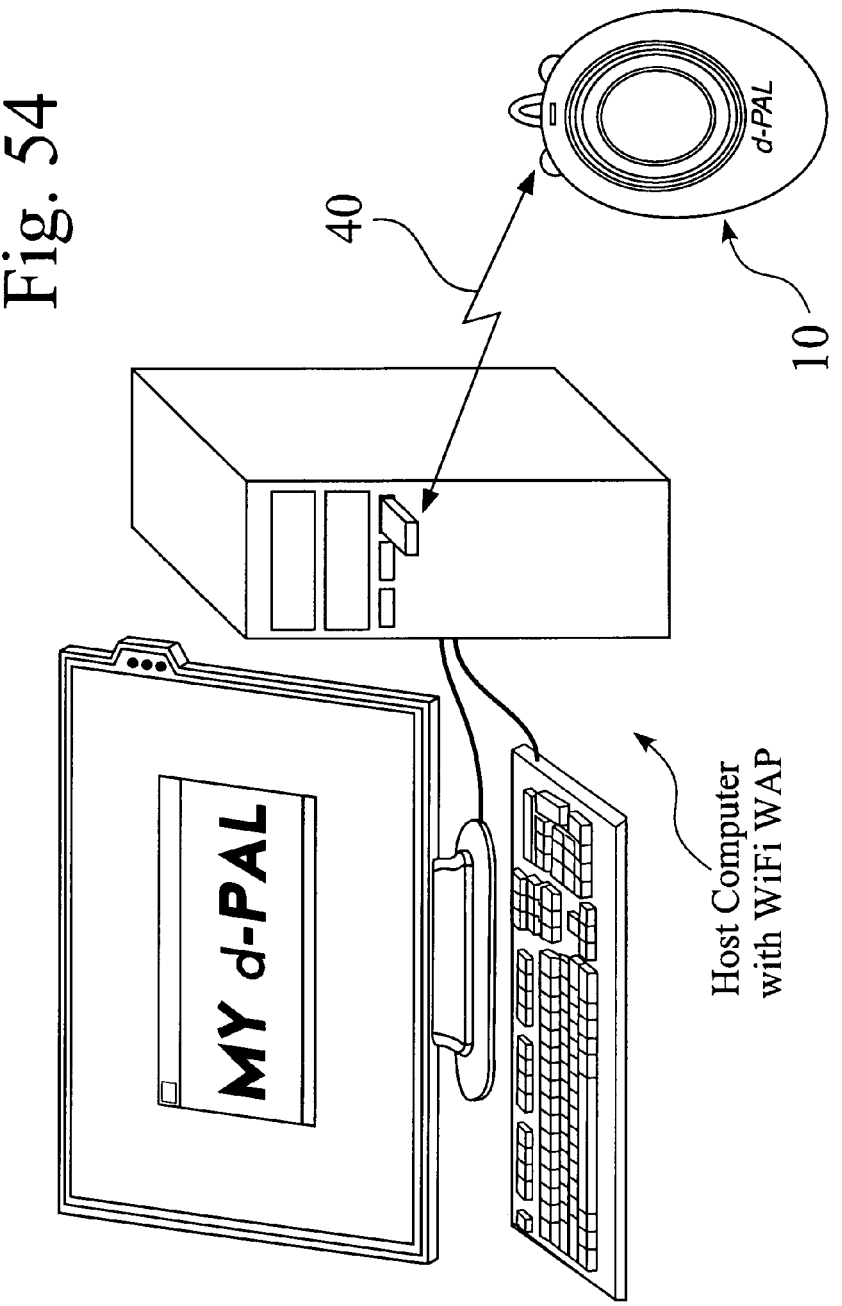

FIG. 54 shows how a d-Pal may communicate with a WiFi wireless access point connected to a desktop computer.

Figure 55:
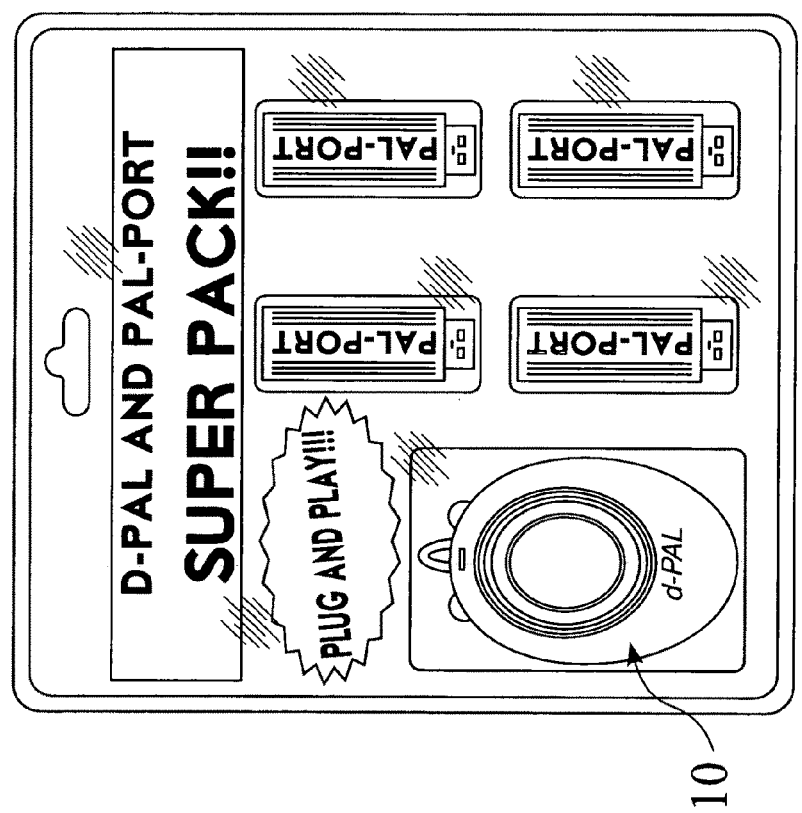

FIG. 55 reveals one embodiment of a retail package, which includes a d-Pal and four transceivers.

Figure 56:
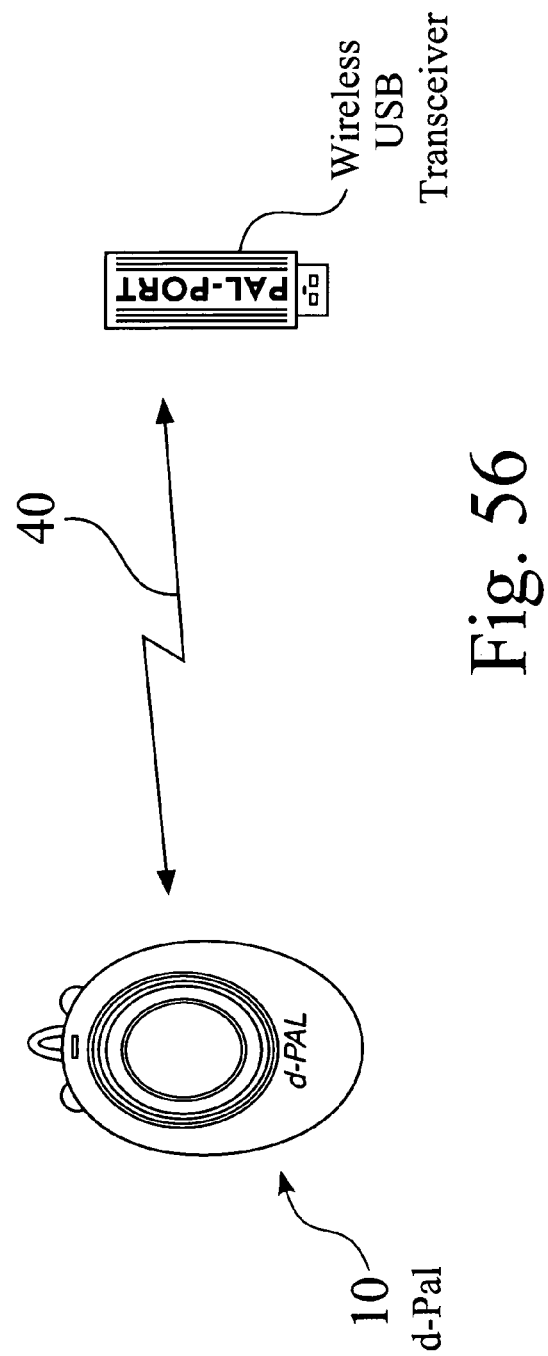

FIG. 56 illustrates two-way, wireless communication between a d-Pal and a transceiver that is configured as a USB plug-in device.

FIG. 57 depicts a person plugging a USB transceiver into a desktop computer, while FIG. 58 depicts a person plugging a USB transceiver into a laptop computer.

A DETAILED DESCRIPTION OF PREFERRED AND ALTERNATIVE EMBODIMENTS

I. Physical Embodiments

Figure 1:
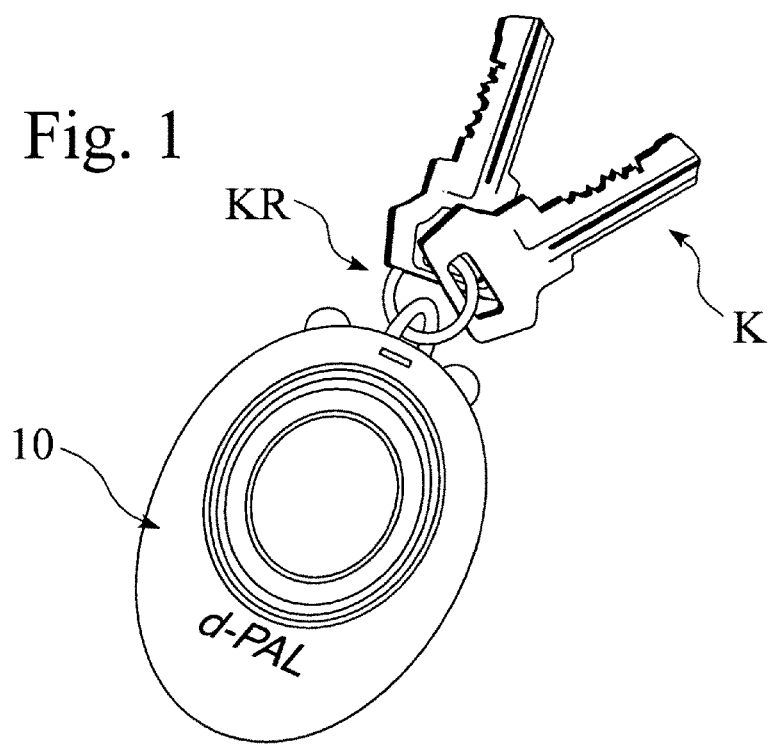

FIG. 1 is a pictorial view of one embodiment of the present invention, a Personal Digital Asset Manager 10, or "d-Pal™." This embodiment comprises an fully-functional, ultra-miniaturized computer without input or output devices, and is small and light enough to be carried on a keyring KR or carried in a pocket, purse or bag. The d-Pal may also be incorporated into an article of clothing or a pair of eyeglasses.

Figure 2:
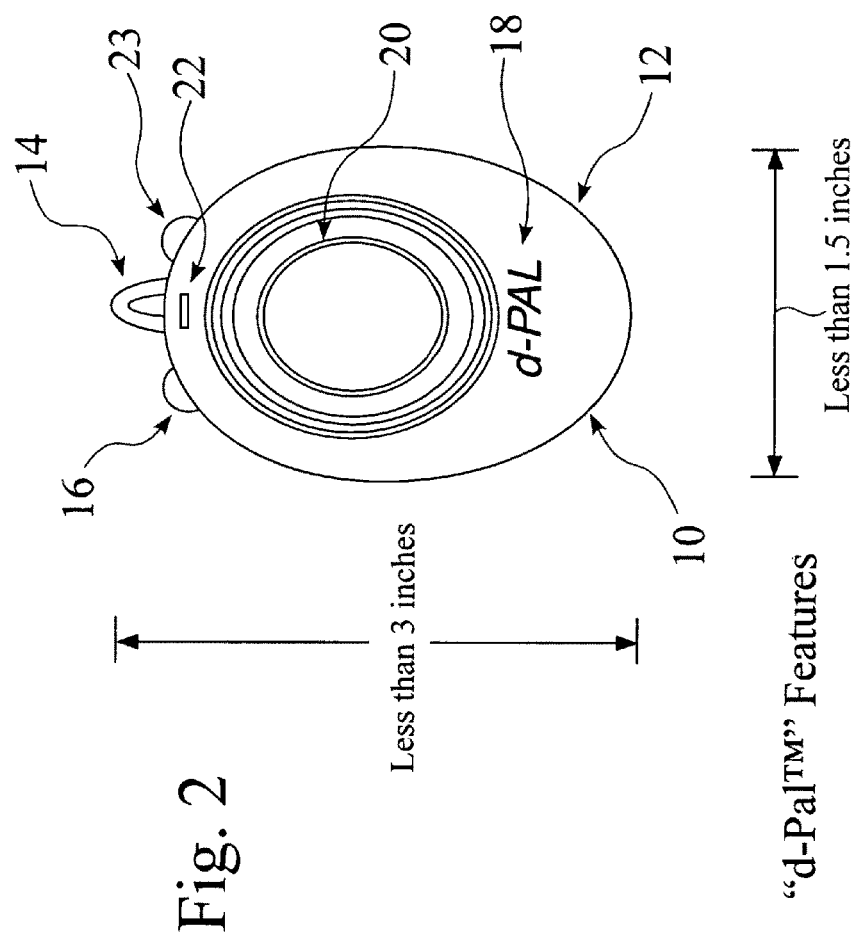

FIG. 2 provides another view of the d-Pal 10, which includes a housing 12, a keyring loop or attachment 14, one or more antennas 16, a front face 18, a combined user control and biometric sensor 20, and a microphone 22.

The user control and biometric sensor may be gimbaled to act as a mouse pointer driver. It may be pressed for mouse clicks, and held down to turn the device off.

In this embodiment, the biometric sensor 20 is a fingerprint reader. This fingerprint reader may verify the user's identification while the invention is out of sight, while stored in a purse, bag or pocket.

Figure 3:
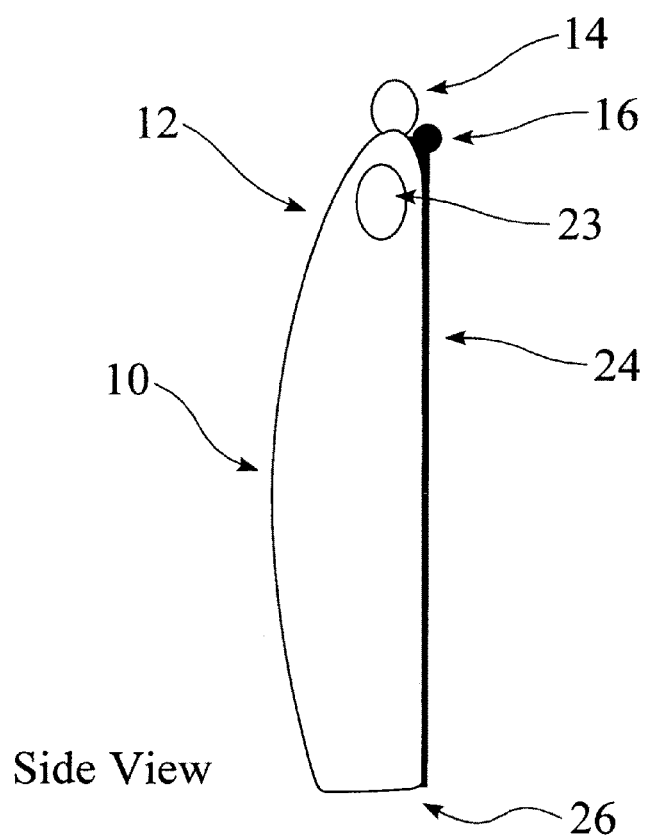

FIG. 3 offers a side view of the device shown in FIGS. 1 and 2. This embodiment is configured with a generally flat back surface 24 and a generally flat bottom surface 26 which may be adapted to sit in a recharging cradle. In this embodiment, the speaker 23 resides within the housing on or near the side surface 24.

Figure 4:
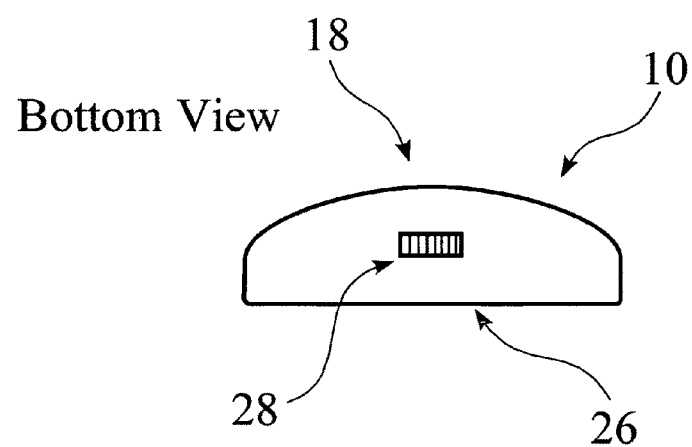

FIG. 4 supplies a view of the bottom surface 26, which may include a port 28 for recharging, such as a USB connector, or some other suitable connection.

The embodiment shown in FIGS. 1, 2, 3 and 4 is designed for wireless use without built-in or physically connected input or output devices.

Figure 5:
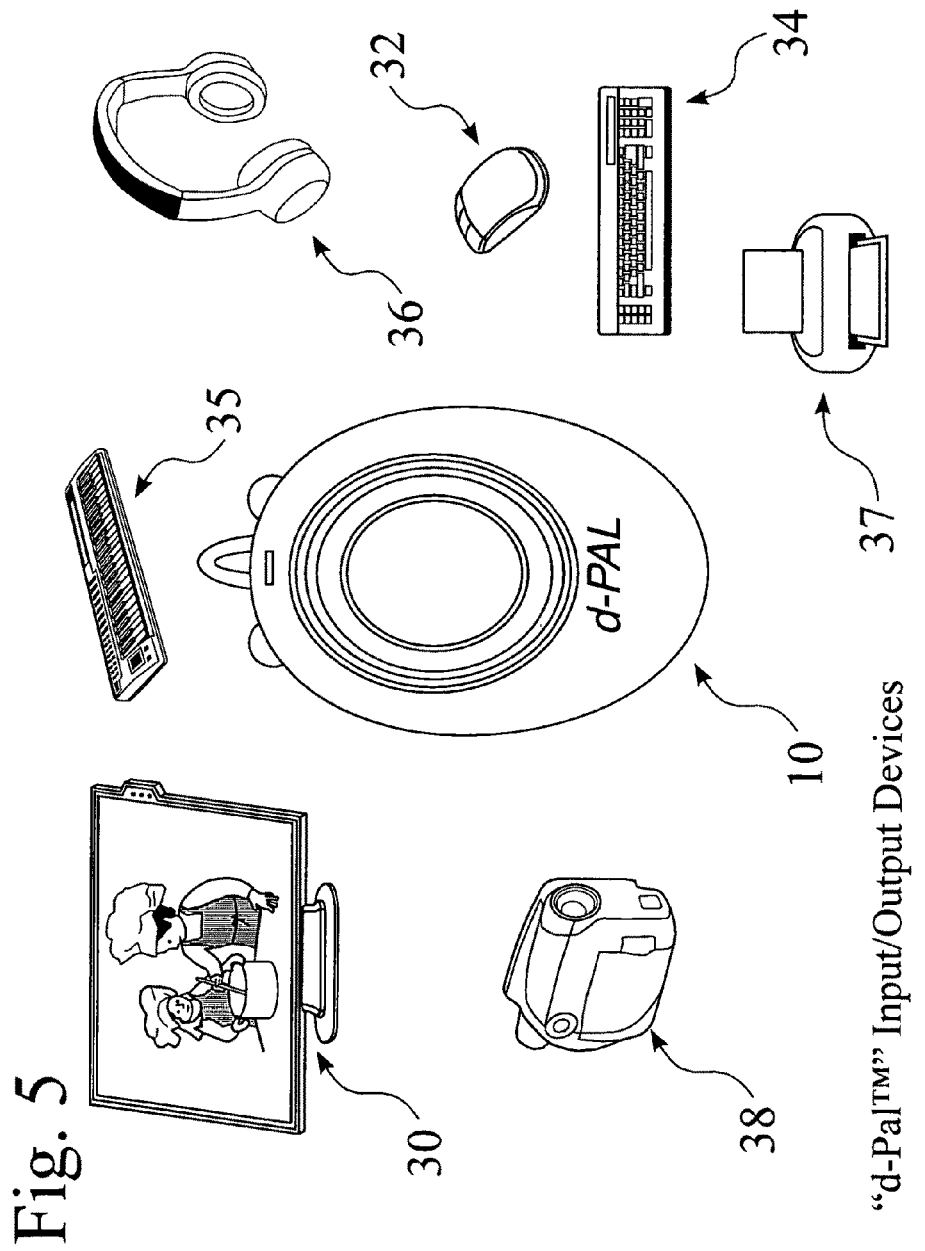

FIG. 5 shows how this embodiment of the invention interacts with peripheral devices like a display 30, a mouse or other pointing device 32, typing keyboard 34, musical keyboard 35, headphones with microphone 36, printer 37, and/or a camera 38.

Figure 6:
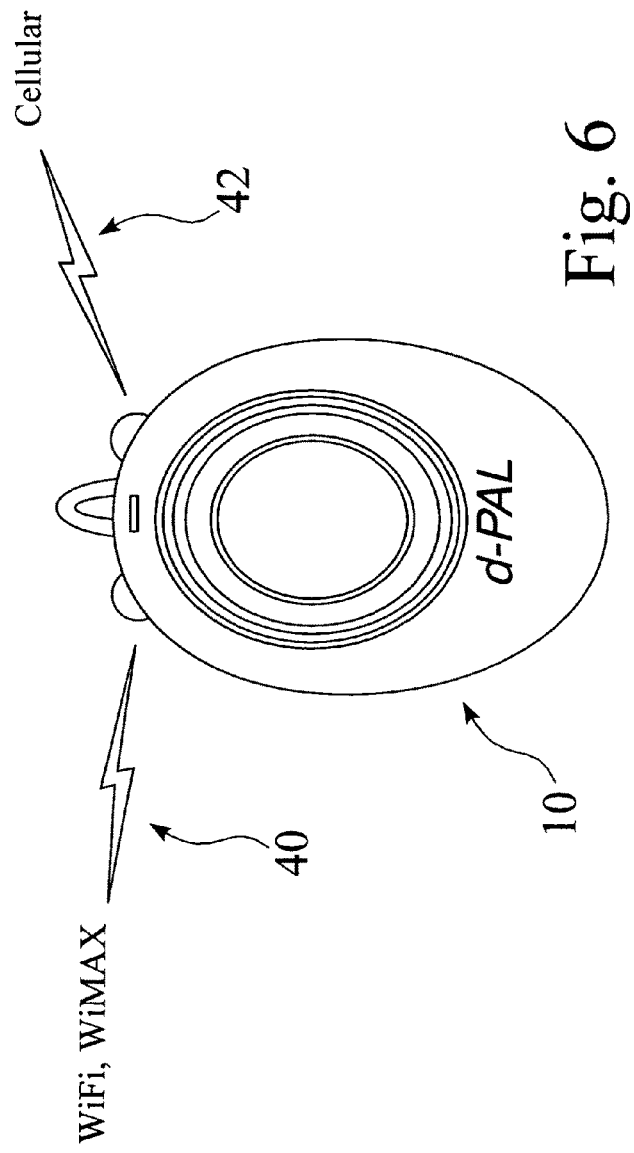

As shown in FIG. 6, this embodiment communicates with input and/or output devices by radio or some other wireless means, such as, but not limited to Wi-Fi, WiMAX, Bluetooth, Zigbee, ultra-wide band connections 40 or cellular or other frequency bands 42, including frequency bands generally above 60 GHz.

Figure 7:
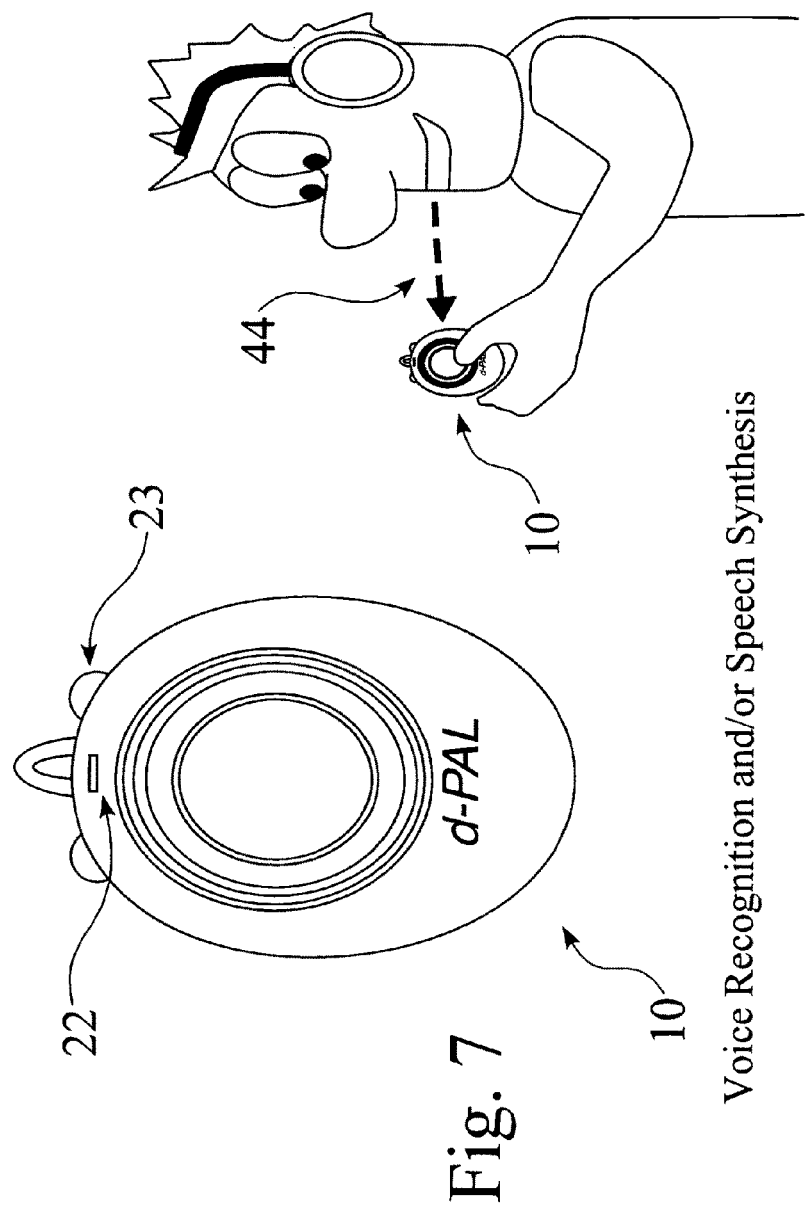
FIG. 7 depicts a d-Pal communicating via voice recognition and/or speech synthesis.

FIG. 7 exhibits another feature of this first embodiment of the invention, which comprises a microphone 22 and speaker 23 for communication via speech synthesis and/or speech recognition 44 and/or music recognition.

Figure 8:
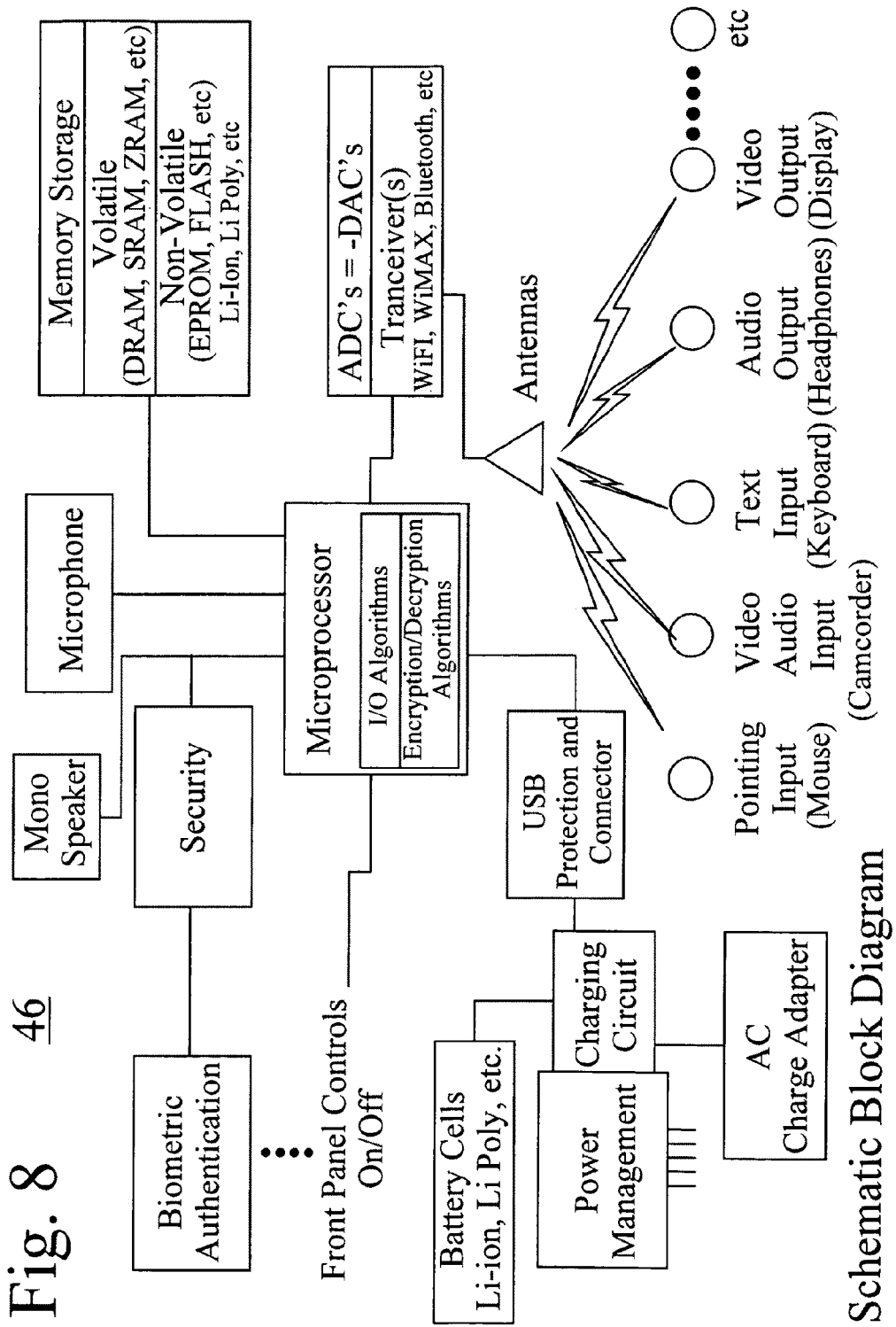
FIG. 8 is a schematic diagram of one embodiment of the components of the invention.

FIG. 8 is a schematic block diagram 46 of one embodiment of the invention, which includes a central processing unit (CPU) or computer chip for processing or conveying a plurality of digital signals. This CPU generally resides within the d-Pal housing. The CPU is connected to or includes a memory chip, drive, solid state memory or other suitable means for storing digital information. The memory means is located generally within the housing. This embodiment also includes a biometric sensor, reader or means for authenticating the identity of a user. The biometric means is coupled to the CPU, and is generally affixed or mounted on the housing. This embodiment also includes a radio or some other first wireless means for providing a wireless connection to one or more peripheral devices. The first wireless means is connected to or incorporated into said central processing unit. All peripheral devices are located outside of, separate and apart from the housing. This embodiment also includes a second wireless means or radio for connecting the d-Pal with a network, such as the Internet or a telephone or other network. The second wireless means is connected to or incorporated into said central processing unit.

Figure 9:
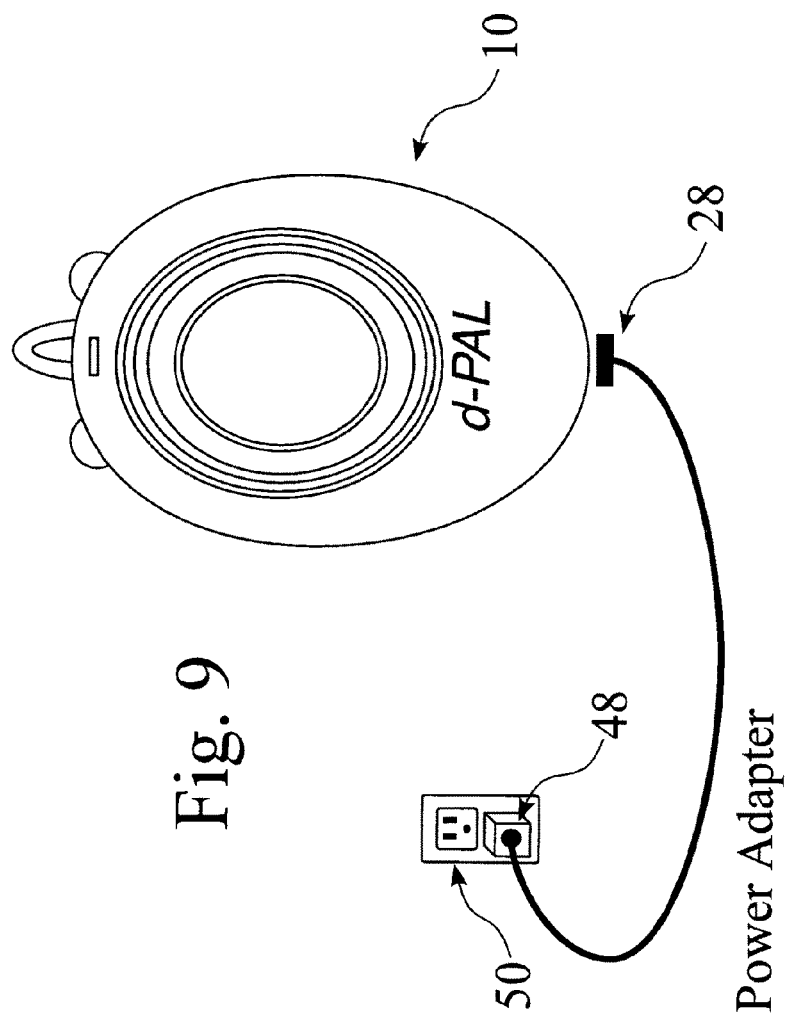
FIG. 9 depicts the invention being charged by a power adapter.

FIG. 9 shows the invention 10 connected to a power adapter 48, which is plugged into a conventional electrical outlet 50.

Figure 10:
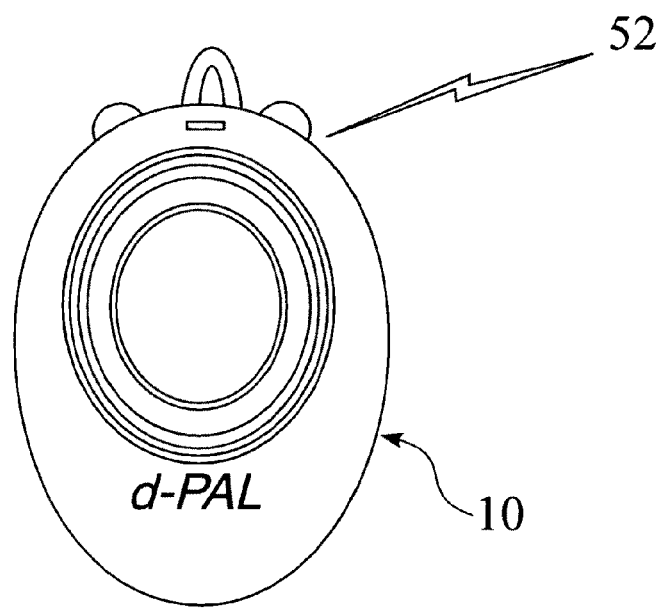
FIG. 10 illustrates an alternative embodiment, which includes automatic wireless backup.

FIG. 10 exhibits an embodiment of the invention that may be used in combination with automatic content backup 52.

Figure 11:
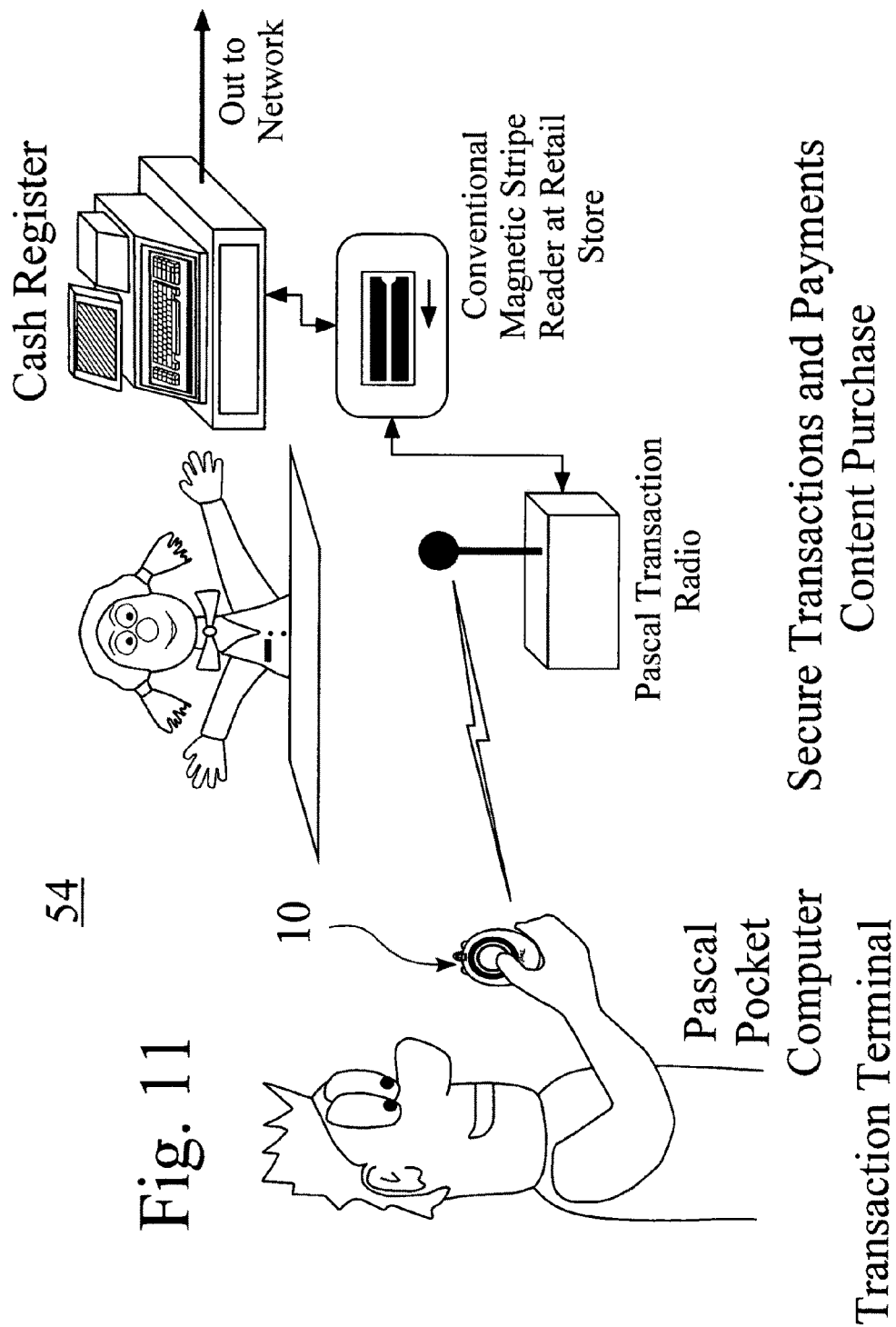
FIG. 11 illustrates an alternative embodiment, which includes wireless content downloads or purchases.

FIG. 11 illustrates secure payments, transactions and content purchases 54. A conventional point-of-sale retail terminal may be enhanced by a connecting a suitable radio to a cash register, magnetic card stripe reader and/or network connection. This additional radio connected to a cash register may communicate with d-Pals for wireless payments, transactions or downloads.

FIG. 12 offers a pictorial view of an alternative embodiment of the present invention.

FIG. 13 exhibits how the present invention may utilize the display and keyboard similar to that of a cellular telephone.

FIGS. 14 and 15 reveal how the present invention may connect to other devices and networks.

FIG. 16 illustrates an alternative embodiment of the invention, which is incorporated into a pair of eyeglasses.

FIG. 17 is a schematic block diagram of the embodiment shown in FIG. 16. This circuitry may include a sensor for detecting and measuring brainwaves. The output of this brainwave sensor may be used to control the functions of the d-Pal.

FIG. 18 illustrates one method of activating the invention, by pressing a control pad 20 on the front face of the housing.

FIG. 19 illustrates a more secure method of activating the invention, by applying a finger pad to the biometric sensor on the front face of the housing.

II. Embodiments of the Invention

FIG. 20 furnishes a view of an alternative embodiment of the invention that may include a skin odor sensor which is able to confirm the identity of the user.

FIG. 21 reveals how the invention may be operated using voice commands. Audible responses may be generated by speech synthesis circuitry.

In an alternative embodiment, the invention may be configured without a built-in speaker and microphone, and may connect to a headset that includes a speaker and microphone.

FIG. 22 depicts the use of a variety of wireless input and output devices, including, but not limited to, a display 30, a keyboard 34, a mouse 32, a printer 37 and a camera 38. Input devices like keyboards 34 and mice 32 may be conventional devices, or may be pocket-sized. The display 30 may be a transportable display which folds, rolls or is otherwise suited for mobile use. The invention may also communicate over a wireless link to a public or private network.

FIG. 23 shows how the invention may be used as a fully functional personal computer, which is capable of running word processing, spreadsheets, Internet browsers, e-mail and other software applications.

FIG. 24 shows show the invention may be used as a cellular telephone, or as some other wired or wireless communication or data transfer device.

FIG. 25 shows how the invention may be used with an optical character reader or barcode scanner.

FIG. 26 shows how the invention may be used as or with a navigation device.

FIG. 27 shows how the invention may be used with a social networking device, such as that described in U.S. Patent Application Publication Number 20070069889.

FIG. 28 shows how the invention may be used as a key to unlock a door, car, building, safe or other secure space, area or item.

FIG. 29 shows how the invention may be used as an RFID reader, together with a system as described in U.S. Patent Application Publication Number 20030214387.

FIG. 30 shows how the invention may be used as a receiver and storage device for content delivered by the RainBarrel Method, as described in U.S. Patent Application Number 20020042919.

FIG. 31 shows how the invention may be used as a pedometer or health monitor.

FIG. 32 exhibits automatic wireless backups which replicate all the content and preferences stored in the memory on a local or remote server, computer or storage device.

FIG. 33 shows how the invention may be used to view content such as a movie on an external display or television.

FIG. 34 offers a view of using the invention to play games.

FIG. 35 furnishes a view of using the invention to surf the Internet.

FIG. 36 depicts an individual who has just lost her Pascal Pocket Computer. A replacement that is fully loaded with all the content stored on the lost, missing or stolen unit may be obtained by placing a quick call to an "800" telephone number or by visiting a website.

FIG. 37 shows how the invention may be used to automatically keep track of searches, preferences, and content libraries and downloads.

FIG. 38 shows how the invention may be used to create secure groups for communication, such as e-mail, or instant or text messaging. The invention may also be used for meetings and workshops with restricted attendance.

FIG. 39 shows how the invention may be used to monitor content viewing, Internet surfing or communications of children.

FIG. 40 shows how the invention may be used as a student's electronic backpack, to carry educational content, textbooks, homework or other school information.

III. Secure Communications

All communications to and/or from the invention may be protected with security systems which thwart or eliminate fraud or misuse. A conventional product, such as RSA's PGP, may be used. In one embodiment of the invention, a communication safeguard means is provided by the UltraSecures$^{SM}$ System, which uses "Electronic DNA" embedded in the device and in remote servers and the user's biometric input to prevent fraud, ID theft, viruses, malware and spam. The UltraSecure System may be stored in its own chip which is connected to the CPU, or may incorporated into the CPU. The UltraSecures$^{SM}$ System is described in U.S. patent application Ser. No. 09/887,570, filed on 22 Jun. 2001, and in PCT International Patent Application No. PCT/GB02/05612, filed on 11 Dec. 2002. Both of these Published Patent Applications are hereby incorporated by reference.

Bilateral and Multilateral UltraSecure

In one embodiment of the invention, the UltraSecure System comprises a Server-side software acting as encryptor for source content and a Client-side software acting as the decryption and re-assembler of the content. Two (Bilateral) or more (Multilateral) devices may be entwined with a dual asynchronous communication path wherein both the Client and Server side portions of the software are installed and registered for both devices (whether in a Ops Center or a Field/Consumer device). Such entwinement enables the use of the UltraSecure Transaction Protocol (USTP) to provide the highest level of communication, content and session security between the two devices, to fully protect data on the device, data in being transferred, data in the host, or data backups being transferred over non USTP protocol systems. Applications include secure two-way communication, remote computing and backups, network transactions (email, web, fund transfers, etc), and access to secured resources (facilities, data information, etc).

IV. Products & Users

FIGS. 41-53 describe alternative embodiments of the invention. In an alternative embodiment, features of the invention which have been described and illustrated as hardware may be reduced to software, and provided as a web service.

The present invention may be embodied in several versions of product, including, but not limited to:

Institutional
Personal
Minor (in the family context)
Minor student
Adult student The Institutional version may include a personal partition. This is for the convenience of the user, who doesn't have to carry a separate laptop. As in a corporate laptop, the institution owns the device and all of its contents, so there is no expectation of privacy in the personal partition. The user may own and carry a separate d-Pal for his own purposes. This second, personally owned d-Pal may be configured by its owner so that it is not accessible by his institution. The institution's d-Pal is automatically backed up on the institution's server, and the personal product is backed up by the user's home device, by various means.

The present invention may also include "Dynamic Partitioning," in which a partition may be created by the device's owner to permit access by certain individuals or classes of individuals. Among other things, this makes the current levels of clearance obsolete, since it establishes a continuum of access which may be changed by the institution to allow access on a case-by-case basis. If the user is the owner, he may set up different partitions for different family members, groups of family members, colleagues, etc. These are not partitions in the sense the word is usually used, to refer to separate areas of a hard disc running, for example, different operating systems, but areas of storage and activity memory which can expand and contract as needed, but which are inaccessible from other partitions in memory. These partitions are accessible by the user with biometric and password identification. When he is using them, he may communicate only with permitted others who have similar identification.

The Dynamic Partitions in the Industrial model may be installed remotely by the person calling a meeting, session or establishing a project; or by the supervisor of a work group or department. In one example, he would request his server to set up partitions for Tom, Dick and Harry on their devices for a period of time, to inform them of the time of the meeting, or the existence of the project and provide them with passwords for that partition. The password distribution would be through an encrypted link such as UltraSecure, and would be available only to the particular user.

This is an automatic process performed by the server, which would automatically remove the partition when it is no longer useful. From the users' points of view, someone called a meeting or established a project and gave them the passwords to access it. Other than the simple process of placing an order on the server, the whole process requires no human intervention. The partition is made out of "rubber," and expands and contracts to fit the data contained therein. When the transaction or project is over, it disappears along with its contents.

As an example, an institutional customer may provide d-Pals to employees. Each employee would create his or her own Dynamic Partitions, eliminating the need for each employee to move company files to other computers. Each partition would, for example, have different rules about printing and file transfer, along with the other constraints and controls, such as biometric and unique-to-the-partition password access.

Dynamic Partitioning may be supported via meta data logic (including search logic) that brings up a side bar. This side bar would suggest access to various partitions and the files stored within them, such as, project alpha, boy scout troop, personal finance, my medical record, etc.

All of the versions may be backed up in various ways (company server, home hard disk, online, etc.) using wired or wireless connections.

One feature which may be included in personal devices and personal partitions is Personal Browsing Preferences, containing search methods, algorithms and the like (Search logic heuristics).

The Minors' products should include parental access and parental site and correspondent blocking.

Both of the Students' products need to contain partitions into which copyrighted material such as textbooks can be loaded, updated and refreshed, on a read-only basis.

Another use of the product would be to gain access to closed areas of the Internet such as social networking and dating sites, corporate meetings, standing committees, corporate files and the like.

The present invention offers the following advantages:

Protection of sensitive data in the office, at home and on the road,

Avoidance of commingling personal, parental and institutional data,

Continuous, automatic backup and refresh,

Instant replacement of lost or stolen products,

Worthlessness of stolen or found product.

Both biometric and password ID should be used for access, to avoid theft and dismemberment.

In an alternative embodiment, the invention may include a proximity verification function which alerts the user when the d-PAL had been moved away from his or her person/immediate vicinity without his or her approval.

In another embodiment, the invention may configured as a web-based service. Data and files may be automatically backed up to a remote server. Back-ups may occur when two device come within range of one another. The d-Pal may also include
a storage base that auto-backs up when the device is dropped in or laid down for power replenishment or when the device is connected to the Internet.

It is becoming common for people who are concerned about net-borne malware to have a computer dedicated to email, web browsing and other web-based activities (the Communications Computer), and a separate, more powerful computer to run their various applications and to store sensitive data. This arrangement is more likely to confine malware to an inexpensive computer with minimal software, which can be easily reformatted if necessary; and because it has a small hard disk and memory, can be scanned very quickly.

This is an awkward arrangement, because it requires either separate monitors, keyboards and pointing devices, or it requires that the user switch some or all of these devices from computer to computer. In any event, the computers themselves take up space and consume significant energy.

In one embodiment of the present invention, one could use the d-Pal for the major applications and use an older or less powerful computer for the communications computer. When in use, the d-Pal would simply use the Communications Computer as a dumb terminal, allowing only simple communications to take place between the two machines. Files collected by the Communications Computer can easily be scanned for malware by one or both of the computers before being transferred to the d-Pal, and files on the d-Pal which are intended for transmission can be similarly scanned by both devices.

V. Wireless Communications

In one embodiment, the present invention communicates over a wireless link with a host computer which is connected to peripheral devices such as a keyboard, a mouse, a monitor, a printer or any other input or output hardware. This communication may be a one-way or a two-way link. Wireless communications may be propagated at any suitable frequency band, including infrared, 900 MHz, cellular telephone bands, 60-100 GHz, Bluetooth, WiFi, Wi-Max, or Zigbee. This wireless link may be a conventional wireless access point (WAP), such as devices manufactured by Netgear or D-Link, which are readily available in the retail marketplace.

FIG. 54 shows how a d-Pal may communicate with a WiFi wireless access point connected to a desktop computer.

FIG. 55 reveals one embodiment of a retail package, which includes a d-Pal and four transceivers.

FIG. 56 illustrates two-way, wireless communication between a d-Pal and a transceiver that is configured as a USB plug-in device.

FIG. 57 depicts a person plugging a USB transceiver into a desktop computer, while FIG. 58 depicts a person plugging a USB transceiver into a laptop computer.

In another embodiment, one or more d-Pals may communicate in an office environment, where a large work space is configured for wireless communications with one or more suitable antennas.

Scope of the Claims

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Personal Digital Asset Manager that have been disclosed above are intended to educate the reader about preferred embodiments of the invention, and are not intended to constrain the limits of the invention or the scope of Claims.

LIST OF REFERENCE CHARACTERS

K Keys
KR Keyring
10 Personal Digital Asset Manager ("d-Pal™")
12 Housing
14 Keyring attachment
16 Antenna
18 Front face of d-Pal
Control & biometric sensor
Microphone
Speaker
Flat back of d-Pal
Flat bottom or end of d-Pal
Power connector (for recharging cradle)
External display
External pointing device
External typing keyboard
External musical keyboard
External headphones with microphone
External camera
40 Wireless connection: Bluetooth, WiFi, WiMAX
42 Wireless connection: Cellular, AM, FM
44 Voice recognition and/or speech synthesis
46 Schematic diagram
48 Power adapter
50 Electrical outlet
52 Automatic content backup
54 Payment, transaction or content purchase

What is claimed is:

1. An apparatus comprising:
   a housing;
   a central processing unit means for processing a plurality of digital signals; said central processing unit being located generally within said housing;
   a memory means for storing digital information; said memory means being coupled to said central processing unit, and being located generally within said housing;
   said memory means including a plurality of expandable dynamic partitions; each of said expandable dynamic partitions being accessible based on separate authorizations;
   said plurality of expandable dynamic partitions being created by the user of a device including said memory means; said plurality of dynamic partitions permitting access by a plurality of certain individuals;
   a biometric means for authenticating the identity of a user; said biometric means being coupled to said central processing unit means; said biometric means being affixed to said housing; and
   a first wireless means for providing a wireless connection to a peripheral device; said wireless means being connected to said central processing unit means; said peripheral device being located outside of, separate and apart from said housing;
   said plurality of expandable dynamic partitions establishing a continuum of access which may be changed to allow access on a case-by-case basis;
   said plurality of expandable dynamic partitions providing a plurality of areas of storage and activity memory which can expand and contract as needed, but which are inaccessible from other partitions in memory; and which are accessible by the user with biometric and password identification; and
   said plurality of expandable dynamic partitions being subject to access by a unique-to-the-partition password.

2. An apparatus as recited in claim 1, in which said memory means is a solid state memory.

3. An apparatus as recited in claim 1, in which said memory means is a flash memory.

4. An apparatus as recited in claim 1, in which said digital information includes an operating system.

5. An apparatus as recited in claim 1, in which said digital information includes a software application.

6. An apparatus as recited in claim 1, in which said digital information includes a computer file.

7. An apparatus as recited in claim 1, in which said digital information includes an audio file.

8. An apparatus as recited in claim 1, in which said digital information includes a digital photo.

9. An apparatus as recited in claim 1, in which said digital information includes a video file.

10. An apparatus as recited in claim 1, in which said biometric means is a fingerprint reader.

11. An apparatus as recited in claim 1, further comprising a communication safeguard means.

12. An apparatus as recited in claim 11, in which said communication safeguard means includes encryption.

13. An apparatus as recited in claim 11, in which said communication safeguard means includes key protection.

14. An apparatus as recited in claim 11, in which said communication safeguard means includes UltraSecure protection.

15. An apparatus as recited in claim 1, in which said wireless means is a USB connector.

16. An apparatus as recited in claim 1, in which said wireless means is a radio.

17. An apparatus as recited in claim 16, in which said radio operates is a WiFi radio.

18. An apparatus as recited in claim 16, in which said radio operates is a BlueTooth radio.

19. An apparatus as recited in claim 16, in which said radio operates using frequency bands which are generally above 60 GHz.

20. A method as recited in claim 19, in which the digital information stored on one of said personal digital asset managers is automatically backed up when an Internet connection is available.

21. An apparatus as recited in claim 16, in which said radio operates is a WiMAX radio.

22. An apparatus as recited in claim 16, in which said radio uses cellular telephone frequencies.

23. An apparatus as recited in claim 1, in which said housing is adapted to clip on to a keyring.

24. An apparatus as recited in claim 1, further comprising a display.

25. An apparatus as recited in claim 1, further comprising a keyboard.

26. An apparatus as recited in claim 1, further comprising a pointing device.

27. An apparatus as recited in claim 1, further comprising a mouse.

28. An apparatus as recited in claim 1, further comprising a camera.

29. An apparatus as recited in claim 1, further comprising a printer.

30. An apparatus as recited in claim 1, further comprising a speaker.

31. An apparatus as recited in claim 1, further comprising a microphone.

32. An apparatus as recited in claim 1, further comprising a voice recognition circuit.

33. An apparatus as recited in claim 1, further comprising a speech synthesis circuit.

34. An apparatus as recited in claim 1, further comprising a power adapter.

35. An apparatus as recited in claim 1, further comprising a battery charger.

36. An apparatus as recited in claim 1, which is used for automatic content backup.

37. An apparatus as recited in claim 1, which is used as a transaction terminal.

38. An apparatus as recited in claim 1, further comprising a cellular telephone, said cellular telephone including a keyboard and a display.

39. An apparatus as recited in claim 38, in which said keyboard and said display on said cellular telephone are used to as input devices.

40. An apparatus as recited in claim 1, which is built into a pair of eyeglasses.

41. An apparatus as recited in claim 40, further comprising a brain wave sensor that provides control functions.

42. An apparatus as recited in claim 1, which is activated by pressing said biometric means.

43. An apparatus as recited in claim 1, which is activated by applying the correct user's fingerprint to said biometric means.

44. An apparatus as recited in claim 1, which identifies its user by skin odor.

45. An apparatus as recited in claim 1, which is used to communicate wirelessly with an external input device.

46. An apparatus as recited in claim 1, which is used to communicate wirelessly with an external output device.

47. An apparatus as recited in claim 1, which is used to communicate wirelessly with an external network.

48. An apparatus as recited in claim 1, which is used as a personal computer.

49. An apparatus as recited in claim 1, which is used as a cellular telephone.

50. An apparatus as recited in claim 1, further comprising a bar code scanner.

51. An apparatus as recited in claim 1, further comprising a navigation device.

52. An apparatus as recited in claim 1, further comprising a social networking device.

53. An apparatus as recited in claim 1, which is used as a key.

54. An apparatus as recited in claim 1, further comprising a radio frequency identification reader.

55. An apparatus as recited in claim 1, which is used as a health monitor.

56. An apparatus as recited in claim 1, which is used as a pedometer.

57. An apparatus as recited in claim 1, which is used to view content.

58. An apparatus as recited in claim 1, which is used to view a movie.

59. An apparatus as recited in claim 1, which is used to view a photo.

60. An apparatus as recited in claim 1, which is used to play a game.

61. An apparatus as recited in claim 1, which is used to visit a website.

62. An apparatus as recited in claim 1, which may be easily replaced with an automatically backed up replacement unit.

63. An apparatus as recited in claim 1, which is used to keep track of a search.

64. An apparatus as recited in claim 1, which is used to store user preferences.

65. An apparatus as recited in claim 1, which is used to keep track of a content library.

66. An apparatus as recited in claim 1, which is used to keep track of a plurality of downloads.

67. An apparatus as recited in claim 1, which is used to create a secure group for safe communication.

68. An apparatus as recited in claim 1, which is used to monitor content viewing by a child.

69. An apparatus as recited in claim 1, which is used to monitor a child's communication.

70. An apparatus as recited in claim 1, which is used as an electronic backpack.

71. An apparatus as recited in claim 1, which is used to create a secure group for safe communication.

72. An apparatus as recited in claim 1, which is used to monitor content viewing by a child.

73. An apparatus as recited in claim 1, which is used to monitor a child's communication.

74. An apparatus as recited in claim 1, which is used as an electronic backpack.

75. An apparatus as recited in claim 1, which is used to organize digital information.

76. An apparatus as recited in claim 1, which is used to organize a plurality of identities.

77. An apparatus as recited in claim 1, which is used to organize a plurality of profiles.

78. An apparatus as recited in claim 1, which is used by an administrator to control a plurality of partitions.

79. An apparatus as recited in claim 1, which is used as a single sign-on and device access manager.

80. An apparatus as recited in claim 1, which is used as a knowledge manager.

81. An apparatus as recited in claim 1, which is used as a search analyzer.

82. An apparatus as recited in claim 1, which is used as a web log.

83. An apparatus as recited in claim 1, which is used as an e-mail log.

84. An apparatus as recited in claim 1, which is used as a single sign-on and device access manager.

85. An apparatus as recited in claim 1, which is used to audit files.

86. An apparatus as recited in claim 1, which is used to create a mirrored backup.

87. An apparatus as recited in claim 1, which is used to decouple co-mingling of data.

88. An apparatus as recited in claim 1, which is used to decouple co-mingling of a plurality of identities.

89. An apparatus as recited in claim 1, further comprising
a host computer;
a peripheral device;
said peripheral device being connected to said host computer; and
a transceiver;
said transceiver being connected to said host computer;
said transceiver being used to convey signals to said host computer to provide remote use of said peripheral device.

90. An apparatus as recited in claim 89, in which said transceiver is a Bluetooth transceiver.

91. An apparatus as recited in claim 89, in which said transceiver is a WiFi transceiver.

92. An apparatus as recited in claim 89, in which said transceiver is a wireless access point.

93. An apparatus as recited in claim 89, in which said transceiver connects to said host computer using a USB port.

94. A method as recited in claim 1, in which the digital information stored on said memory means is automatically backed up on a storage device.

95. An apparatus as recited in claim 1, in which said wireless means is a transceiver that is configured as a USB plug-in device.

96. A method as recited in claim 1, in which the digital information stored on said memory means is automatically backed up on a storage device.

97. An apparatus as recited in claim 1, in which said plurality of expandable dynamic partitions provides a plurality of levels of clearance.

98. An apparatus as recited in claim 1, in which said plurality of expandable dynamic partitions provides different partitions for different family members.

99. An apparatus as recited in claim 1, in which said plurality of expandable dynamic partitions provides different partitions for different colleagues.

100. An apparatus as recited in claim 1, in which said plurality of expandable dynamic partitions provides different partitions for different co-workers.

101. An apparatus as recited in claim 1, in which said plurality of expandable dynamic partitions, which, when being used is using them, may communicate only with permitted others who have similar identification.

102. An apparatus as recited in claim 1, in which said plurality of expandable dynamic partitions model may be installed remotely.

103. An apparatus as recited in claim 1, in which said plurality of expandable dynamic partitions are automatically removed when no longer useful.

104. An apparatus as recited in claim 1, in which said plurality of expandable dynamic partitions, when removed, disappear along with its contents.

105. An apparatus as recited in claim 1, in which said plurality of expandable dynamic partitions are subject to different rules concerning printing.

106. An apparatus as recited in claim 1, in which said plurality of expandable dynamic partitions are subject to different rules concerning file transfer.

107. An apparatus as recited in claim 1, in which said plurality of expandable dynamic partitions are subject to access by a biometric input.

108. An apparatus as recited in claim 1, in which said plurality of expandable dynamic partitions are supported via meta data logic that brings up a side bar, which suggests access to various partitions and the files stored within them.

109. An apparatus comprising:

a housing;

a central processing unit means for processing a plurality of digital signals; said central processing unit being located generally within said housing;

a memory means for storing digital information; said memory means being coupled to said central processing unit, and being located generally within said housing;

said memory means including a plurality of expandable dynamic partitions; each of said expandable dynamic partitions being accessible based on separate authorizations; said plurality of expandable dynamic partitions being created by the user of a device including said memory means; said plurality of dynamic partitions permitting access by a plurality of certain individuals; and a first wireless means for providing a wireless connection to a peripheral device; said wireless means being connected to said central processing unit means; said peripheral device being located outside of, separate and apart from said housing;

said plurality of expandable dynamic partitions establishing a continuum of access which may be changed to allow access on a case-by-case basis;

said plurality of expandable dynamic partitions providing a plurality of areas of storage and activity memory which can expand and contract as needed, but which are inaccessible from other partitions in memory; and which are accessible by the user with biometric and password identification; and said plurality of expandable dynamic partitions being subject to access by a unique-to-the-partition password.

* * * * *